(12) United States Patent
MacCallum et al.

(10) Patent No.: US 9,694,910 B2
(45) Date of Patent: Jul. 4, 2017

(54) NEAR-SPACE OPERATION SYSTEMS

(71) Applicant: WORLD VIEW ENTERPRISES, INC., Tucson, AZ (US)

(72) Inventors: Taber K. MacCallum, Tucson, AZ (US); Jacob H. Dang, Tempe, AZ (US); Robert Alan Eustace, Menlo Park, CA (US); John Zaniel Maccagnano, Tucson, AZ (US); Julian R. Nott, Santa Barbara, CA (US); Sebastian A. Padilla, Tucson, AZ (US); Sreenivasan Shankarnarayan, Hyderabad (IN); John Straus, Vail, AZ (US); Jared Leidich, Golden, CO (US); Daniel Pieter Jacobus Blignaut, Deland, FL (US)

(73) Assignee: World View Enterprises Inc., Tucson, AZ (US)

(*) Notice: Subject to any disclaimer, the term of this patent is extended or adjusted under 35 U.S.C. 154(b) by 156 days.

(21) Appl. No.: 14/188,581

(22) Filed: Feb. 24, 2014

(65) Prior Publication Data

US 2015/0284065 A1 Oct. 8, 2015

Related U.S. Application Data

(60) Provisional application No. 61/822,355, filed on May 11, 2013, provisional application No. 61/813,918, (Continued)

(51) Int. Cl.
*B64B 1/02* (2006.01)
*B64D 17/64* (2006.01)
(Continued)

(52) U.S. Cl.
CPC ............... *B64D 17/64* (2013.01); *B64B 1/40* (2013.01); *B64D 10/00* (2013.01); *B64D 17/22* (2013.01);
(Continued)

(58) Field of Classification Search
CPC .......... B64B 1/02; B64D 17/22; B64D 17/64; B64D 17/00; B64D 17/62
See application file for complete search history.

(56) References Cited

U.S. PATENT DOCUMENTS 1,012,559 A 12/1911 Kalaba
1,056,503 A 3/1913 Cooper
(Continued)

FOREIGN PATENT DOCUMENTS

CN 2844003 12/2006
CN 200988579 12/2007
(Continued)

OTHER PUBLICATIONS

Winzen et al, "Operation Manhigh II", 1958, Journal of Jet Propulsion, vol. 28, No. 8, pp. 523-532.*
(Continued)

*Primary Examiner* — Medhat Badawi
*Assistant Examiner* — Vicente Rodriguez
(74) *Attorney, Agent, or Firm* — Knobbe, Martens, Olson & Bear, LLP

(57) ABSTRACT

A system enabling safe manned and unmanned operations at extremely high altitudes (above 70,000 feet). The system utilizes a balloon launch system and parachute and/or parafoil recovery.

19 Claims, 13 Drawing Sheets

Related U.S. Application Data filed on Apr. 19, 2013, provisional application No. 61/768,183, filed on Feb. 22, 2013.

(51) Int. Cl.
- *B64D 17/22* (2006.01)
- *B64B 1/40* (2006.01)
- *B64D 10/00* (2006.01)

(52) U.S. Cl.
CPC .. *B64D 2010/005* (2013.01); *B64D 2010/007* (2013.01)

(56) References Cited

U.S. PATENT DOCUMENTS

| | | |
|---|---|---|
| 1,477,338 A | 12/1923 | Finley |
| 1,656,780 A | 1/1928 | Diago |
| 1,829,561 A | 10/1931 | Knight |
| 2,083,743 A | 6/1937 | Poole |
| 2,708,082 A | 5/1955 | Moore et al. |
| 2,950,881 A * | 8/1960 | Schwoebel .............. B64B 1/00 244/127 |
| 2,954,187 A * | 9/1960 | Winzen .................... B64B 1/40 244/31 |
| 2,977,069 A | 3/1961 | Huch et al. |
| 3,015,456 A | 1/1962 | Deisinger |
| 3,073,040 A | 1/1963 | Schueller |
| 3,087,696 A | 4/1963 | Sepp, Jr. |
| 3,093,346 A | 6/1963 | Faget et al. |
| 3,098,630 A | 7/1963 | Conners |
| 3,146,500 A | 9/1964 | Volkert |
| 3,195,834 A | 7/1965 | Huch et al. |
| 3,260,480 A | 7/1966 | Ash et al. |
| 3,270,908 A | 9/1966 | Faget et al. |
| 3,312,427 A | 4/1967 | Yost |
| 3,424,405 A | 1/1969 | Struble, Jr. |
| 3,432,122 A | 3/1969 | Flickinger et al. |
| 3,434,680 A * | 3/1969 | Ferguson ................. B64D 1/22 244/142 |
| 3,446,458 A | 5/1969 | Rogallo |
| 3,465,482 A | 9/1969 | Chandler |
| 3,558,083 A | 1/1971 | Conley et al. |
| 3,606,212 A | 9/1971 | Paine |
| 3,814,353 A | 6/1974 | Nelson |
| 4,113,206 A | 9/1978 | Wheeler |
| 4,215,834 A | 8/1980 | Dunlap |
| 4,664,343 A | 5/1987 | Lofts et al. |
| 4,828,207 A | 5/1989 | Haynes |
| 4,889,394 A | 12/1989 | Ruspa |
| 4,936,528 A | 6/1990 | Butner et al. |
| 5,028,018 A | 7/1991 | Krebber |
| 5,244,169 A | 9/1993 | Brown et al. |
| 5,274,976 A | 1/1994 | Burkhart |
| 5,327,904 A | 7/1994 | Hannum |
| 5,333,817 A | 8/1994 | Kalisz et al. |
| 5,362,017 A | 11/1994 | Puckett |
| 5,511,748 A | 4/1996 | Scott |
| 5,620,153 A | 4/1997 | Ginsberg |
| 5,884,981 A | 3/1999 | Ichikawa |
| 5,893,536 A | 4/1999 | Lee et al. |
| 6,116,538 A | 9/2000 | Häfelfinger |
| 6,220,547 B1 * | 4/2001 | Smith .................. B64D 17/025 244/147 |
| 6,234,425 B1 * | 5/2001 | Rand ........................ B64B 1/46 244/137.4 |
| 6,360,988 B1 | 3/2002 | Monroe |
| 6,425,640 B1 | 7/2002 | Hussaini |
| 6,527,223 B1 | 3/2003 | Mondale |
| 6,565,042 B1 | 5/2003 | Yamada |
| 6,596,370 B2 | 7/2003 | Hyuga et al. |
| 6,604,333 B1 | 8/2003 | Schiedegger et al. |
| 6,626,400 B1 | 9/2003 | Booth |
| 6,648,272 B1 | 11/2003 | Kothman |
| 6,705,572 B1 | 3/2004 | Christopher |
| 6,799,810 B1 | 10/2004 | Wang |
| 6,883,756 B2 | 4/2005 | Preston |
| 6,889,942 B2 | 5/2005 | Preston |
| 7,168,922 B2 | 1/2007 | Stagg et al. |
| D557,817 S | 12/2007 | Verfuerth |
| 7,313,362 B1 | 12/2007 | Sainct |
| D575,410 S | 8/2008 | Best |
| 7,469,857 B2 | 12/2008 | Voss |
| 7,530,527 B2 | 5/2009 | Kelleher |
| 7,556,040 B2 | 7/2009 | Meyer et al. |
| 7,584,928 B2 | 9/2009 | Hoffmann |
| 7,775,604 B2 | 8/2010 | Chen |
| D632,804 S | 2/2011 | Afasano |
| 8,091,826 B2 | 1/2012 | Voorhees |
| 8,100,367 B1 | 1/2012 | Rousseau |
| 8,116,763 B1 | 2/2012 | Olsen |
| 8,167,240 B2 | 5/2012 | Greiner |
| 8,267,348 B2 | 9/2012 | Alavi |
| 8,448,898 B1 | 5/2013 | Frolov et al. |
| 8,505,847 B2 | 8/2013 | Ciampa et al. |
| 8,622,338 B2 | 1/2014 | Ciampa et al. |
| 8,718,477 B2 | 5/2014 | DeVaul et al. |
| 8,777,156 B2 | 7/2014 | Piini et al. |
| 8,781,727 B1 | 7/2014 | Bonawitz et al. |
| 8,804,228 B1 | 8/2014 | Biffle et al. |
| 8,812,176 B1 | 8/2014 | Biffle et al. |
| 8,814,084 B2 | 8/2014 | Shenhar |
| 8,820,678 B2 | 9/2014 | DeVaul et al. |
| 8,833,696 B1 | 9/2014 | Teller et al. |
| 8,849,571 B1 | 9/2014 | Bonawitz et al. |
| 8,862,403 B1 | 10/2014 | Piponi et al. |
| 8,874,356 B1 | 10/2014 | Bonawitz |
| 8,880,326 B1 | 11/2014 | Bonawitz et al. |
| 8,897,933 B1 | 11/2014 | Teller et al. |
| 8,910,905 B2 | 12/2014 | DeVaul et al. |
| 8,917,995 B1 | 12/2014 | Biffle et al. |
| 8,918,047 B1 | 12/2014 | Teller et al. |
| 8,948,927 B1 | 2/2015 | Piponi |
| 8,971,274 B1 | 3/2015 | Teller et al. |
| 8,988,253 B2 | 3/2015 | Teller et al. |
| 8,996,024 B1 | 3/2015 | Teller et al. |
| 8,998,128 B2 | 4/2015 | Ratner |
| 9,010,691 B1 | 4/2015 | Ratner et al. |
| 9,016,634 B1 | 4/2015 | Ratner et al. |
| 9,027,874 B1 | 5/2015 | Roach et al. |
| 9,033,274 B2 | 5/2015 | DeVaul et al. |
| 9,033,281 B1 | 5/2015 | Adams |
| 9,045,213 B1 | 6/2015 | DeVaul |
| 9,067,666 B1 | 6/2015 | Roach et al. |
| 9,085,348 B1 | 7/2015 | Roach et al. |
| 9,090,323 B1 | 7/2015 | Ratner |
| 9,093,754 B2 | 7/2015 | Behroozi et al. |
| 9,096,301 B1 | 8/2015 | Biffle et al. |
| 9,097,361 B1 | 8/2015 | Ratner |
| 9,106,336 B1 | 8/2015 | Brouillet |
| 9,114,866 B1 | 8/2015 | Roach |
| 9,120,551 B1 | 9/2015 | Ratner |
| 9,139,278 B1 | 9/2015 | Roach et al. |
| 9,139,279 B2 | 9/2015 | Heppe |
| 9,148,215 B1 | 9/2015 | Bonawitz |
| 9,153,854 B1 | 10/2015 | Biffle et al. |
| 9,174,718 B1 | 11/2015 | Roach et al. |
| 9,174,720 B1 | 11/2015 | Ratner |
| 9,174,738 B1 | 11/2015 | Roach et al. |
| 9,193,480 B2 | 11/2015 | Smith et al. |
| 9,195,938 B1 | 11/2015 | Bonawitz et al. |
| 9,201,426 B1 | 12/2015 | Bonawitz |
| 9,203,148 B1 | 12/2015 | Teller et al. |
| 9,211,942 B1 | 12/2015 | Roach |
| 9,221,531 B1 | 12/2015 | Brookes |
| 9,233,746 B2 | 1/2016 | DeVaul et al. |
| 9,242,712 B1 | 1/2016 | Ratner |
| 9,254,906 B1 | 2/2016 | Behroozi et al. |
| 9,266,598 B1 | 2/2016 | DeVaul |
| 9,275,551 B2 | 3/2016 | Bonawitz et al. |
| 9,281,554 B1 | 3/2016 | Behroozi et al. |
| 9,285,450 B2 | 3/2016 | DeVaul et al. |
| 9,290,258 B1 | 3/2016 | DeVaul |
| 9,296,461 B1 | 3/2016 | Roach |
| 9,296,462 B1 | 3/2016 | Brookes et al. |

(56) References Cited

U.S. PATENT DOCUMENTS

| | | | |
|---|---|---|---|
| 9,300,388 | B1 | 3/2016 | Behroozi et al. |
| 9,306,668 | B2 | 4/2016 | DeVaul et al. |
| 9,318,789 | B1 | 4/2016 | Henrich et al. |
| 9,321,517 | B1 | 4/2016 | DeVaul |
| 9,327,816 | B1 | 5/2016 | Mathe et al. |
| 9,327,817 | B1 | 5/2016 | Roach |
| 9,327,818 | B1 | 5/2016 | Roach |
| 9,329,600 | B2 | 5/2016 | DeVaul et al. |
| 9,340,272 | B1 | 5/2016 | DeVaul et al. |
| 9,346,531 | B1 | 5/2016 | Washburn et al. |
| 9,346,532 | B1 | 5/2016 | Ratner |
| 2002/0179771 | A1 | 12/2002 | Senepart |
| 2002/0190161 | A1 | 12/2002 | Patel et al. |
| 2003/0020322 | A1 | 1/2003 | Zaniboni |
| 2003/0040273 | A1 | 2/2003 | Seligsohn et al. |
| 2003/0127560 | A1 | 7/2003 | Liss |
| 2003/0197095 | A1 | 10/2003 | Preston |
| 2003/0234320 | A1 | 12/2003 | Colting |
| 2004/0089763 | A1 | 5/2004 | Redmond |
| 2004/0218397 | A1 | 11/2004 | Luo |
| 2005/0121968 | A1 | 6/2005 | McCaster, III et al. |
| 2005/0288114 | A1 | 12/2005 | Meadows |
| 2006/0065777 | A1 | 3/2006 | Walden et al. |
| 2006/0284006 | A1 | 12/2006 | Chasman et al. |
| 2007/0164600 | A1 | 7/2007 | Chiu |
| 2007/0272801 | A1 | 11/2007 | Hilliard et al. |
| 2009/0108135 | A1 | 4/2009 | Shaw |
| 2009/0134277 | A1 | 5/2009 | Kim et al. |
| 2009/0189015 | A1 | 7/2009 | Alavi |
| 2009/0206196 | A1 | 8/2009 | Parks et al. |
| 2009/0224094 | A1 | 9/2009 | Lachenmeier |
| 2010/0163682 | A1 | 7/2010 | Jameson |
| 2010/0257983 | A1 | 10/2010 | Jordan et al. |
| 2011/0147513 | A1* | 6/2011 | Surmont .................. B64B 1/10 244/33 |
| 2011/0198437 | A1 | 8/2011 | Brandon |
| 2011/0233325 | A1 | 9/2011 | Kramer |
| 2012/0091261 | A1 | 4/2012 | Lee |
| 2012/0133197 | A1 | 5/2012 | Mengle et al. |
| 2012/0168565 | A1 | 7/2012 | Berland |
| 2012/0228434 | A1* | 9/2012 | Lopez Urdiales ..... B64G 1/002 244/158.9 |
| 2012/0273620 | A1 | 11/2012 | Culbreath |
| 2012/0312919 | A1 | 12/2012 | Heppe |
| 2013/0037654 | A1 | 2/2013 | Zhang et al. |
| 2013/0043341 | A1 | 2/2013 | Tai et al. |
| 2013/0049440 | A1 | 2/2013 | Morse et al. |
| 2013/0062458 | A1 | 3/2013 | Shenhar |
| 2013/0177322 | A1 | 7/2013 | DeVaul et al. |
| 2013/0238784 | A1 | 9/2013 | Teller et al. |
| 2013/0303218 | A1 | 11/2013 | Teller et al. |
| 2014/0014770 | A1 | 1/2014 | Teller et al. |
| 2014/0155093 | A1 | 6/2014 | Teller |
| 2014/0171075 | A1 | 6/2014 | Teller |
| 2015/0024653 | A1 | 1/2015 | Huebl |
| 2015/0061937 | A1 | 3/2015 | Bonawitz et al. |
| 2015/0225091 | A1 | 8/2015 | Ratner |
| 2015/0336653 | A1 | 11/2015 | Anderson et al. |
| 2015/0360763 | A1 | 12/2015 | Smith et al. |
| 2015/0367928 | A1 | 12/2015 | Crites |
| 2016/0018823 | A1 | 1/2016 | Longmier et al. |
| 2016/0052614 | A1 | 2/2016 | Longmier et al. |
| 2016/0083068 | A1 | 3/2016 | Crites |
| 2016/0090179 | A1 | 3/2016 | Childress et al. |
| 2016/0096612 | A1 | 4/2016 | Longmier et al. |
| 2016/0154085 | A1 | 6/2016 | DeVaul et al. |
| 2016/0156405 | A1 | 6/2016 | Teller et al. |

FOREIGN PATENT DOCUMENTS

| | | |
|---|---|---|
| CN | 202765296 | 3/2013 |
| CN | 102673770 | 3/2015 |
| CN | 204937453 | 1/2016 |
| DE | 38 05 645 | 7/1988 |
| DE | 39 27 297 | 2/1991 |
| DE | 10 2008 035 028 | 1/2010 |
| EP | 0 401 891 | 12/1992 |
| FR | 2 320 229 | 3/1977 |
| FR | 2 724 909 | 3/1996 |
| FR | 2 834 966 | 7/2003 |
| GB | 191207587 | 9/1912 |
| GB | 2184699 | 7/1987 |
| GB | 2244962 B | 8/1993 |
| JP | 2002-096798 | 4/2002 |
| RU | 2 028 962 | 2/1995 |
| RU | 2 186 003 | 7/2002 |
| WO | WO 97/15992 | 5/1997 |
| WO | 2004/106156 A1 | 12/2004 |
| WO | WO 2006/119056 | 11/2006 |
| WO | WO 2010/130043 | 11/2010 |
| WO | 2011160172 A1 | 12/2011 |
| WO | WO 2013/041820 | 3/2013 |
| WO | WO 2014/025622 | 2/2014 |
| WO | WO 2014/193711 | 12/2014 |
| WO | WO 2015/031165 | 3/2015 |
| WO | WO 2015/076899 | 5/2015 |
| WO | WO 2015/094534 | 6/2015 |
| WO | WO 2015/094941 | 6/2015 |
| WO | WO 2015/102813 | 7/2015 |
| WO | WO 2015/122988 | 8/2015 |
| WO | WO 2015/130414 | 9/2015 |
| WO | WO 2015/157237 | 10/2015 |
| WO | WO 2015/196216 | 12/2015 |
| WO | WO 2016/081345 | 5/2016 |

OTHER PUBLICATIONS

"Homepage", World View Website, May 8, 2015, 1.
Coldiron, et al., "Crew Escape Systems 21002", https://www.nasa.gov/ . . . /383443main_crew_escape_workbook.pdf Jan. 17, 2005.
U.S. Appl. No. 14/188,581, filed Feb. 24, 2014, MacCallum et al.
U.S. Appl. No. 15/065,828, filed Sep. 15, 2016, MacCallum et al.
Aerospace-Technology.com: "World View Successfully Completes Test Flight for Commercial Balloon Flights," Aerospace-Technology.com, online article dated Oct. 27, 2015. http://www.aerospace-technology.com/news/newsworld-view-test-flights-commercial-balloon-flight-4702892.
Aljazeera America: "Space tourism company breaks record with high-altitude balloon flight", online article dated Jun. 25, 2014. http://america.aljazeera.com/articles/2014/6/25/balloonspace-tourism.html.
Benton, J. et al.: "On Development of Autonomous HAHO Parafoil System for Targeted Payload Return", AIAA Aerospace Decelerator Systems (ADS) Conference, Mar. 2013, in 26 pages.
Berger, E.: "Record-Breaking Balloon Flight", Outside Online, online article dated Jun. 25, 2014. http://www.outsideonline.com/1804196/record-breakingballoon-flight.
Boyle, A.: "Heads Up, Strato-Tourists: World View Begins High-Flying Tests", NBC News, online article dated Jun. 24, 2014. http://www.nbcnews.com/science/space/heads-stratotourists-world-view-begins-high-flying-tests-n138986.
Boyle, A.: "World View Balloon Lofts NASA Experiments to Near-Space Heights," NBC News, online article dated Mar. 9, 2015. http://www.nbcnews.com/science/space/world-view-balloon-lofts-nasa-experiments-near-space-heights-n320216.
Clausing, J.: "Arizona company successfully tests high-altitude balloon for space tourism", US News, online article dated Jun. 24, 2014. http://www.usnews.com/news/business/articles/2014/06/24/company-successfully-tests-space-tourism-balloon.
Denuder, M.: "Development of a Paraglide-Deployment System for a Base Jumping Robot", Bachelor—Thesis, Swiss Federal Institute of Technology Zurich, Jun. 2011, in 111 pages.
Foust, J.: "World View tests scale model of its high-altitude balloon system", NewSpace Journal, online article dated Jun. 24, 2014. http://www.newspacejournal.com/2014/06/24/worldview-tests-scale-model-of-its-high-altitude-balloon-system/.
Gannon, M.: "World View Launches Test Balloon to Edge of Space, Breaks Record", Space.com, online article dated Jun. 24, 2014. http://www.space.com/26340-world-view-balloon-testflight-record.html.

(56) References Cited

OTHER PUBLICATIONS

Haugen, J.: "After Successful Flight Test, World View Ready for Next Phase: The Stratospheric Tourism Company Is Setting Its Sights High," Popular Science, online article dated Oct. 26, 2015. http://www.popsci.com/world-view-completes-first.
Howell, E.: "World View Makes Record-Setting Parafoil Flight from Near Edge of Space," Space.com, online article dated Feb. 21, 2015. http://www.space.com/28626-world-view-parafoil-record-flight.html.
Howell, E.: "World View Parafoil Test Flight Touches Edge of Space," Discovery News, online article dated Feb. 23, 2015. http://www.seeker.com/world-view-parafoil-test-flight-touches-edge-of-space-1769541739.html#news.discovery.com.
Klotz, I.: "World View Prototype Balloon Reaches for Edge of Space", Seeker, online article dated Jun. 25, 2014. http://www.seeker.com/world-view-prototype-balloon-reaches-for-edge-of-space-1768745428.html#news.discovery.com.
Knapp, A.: "World View Has a Successful Scaled Test Flight of Its Balloon to Space", Forbes, online article dated Jun. 24, 2014. http://www.forbes.com/sites/alexknapp/2014/06/24/world-view-has-a-successful-scaled-test-flight-of-its-balloon-tospace/#4e726063f229.
Larimer, S.: "Company takes test flight to the least-crowded tourism hot spot: space", The Washington Post, online article dated Jun. 27, 2014. http://www.washingtonpost.com/news/postnation/wp/2014/06/27/company-takes-test-flight-to-theleast-crowded-tourism-hot-spot-space/.
Lawler, R.: "Google exec sets a new record for highest-altitude jump (video)", Engadget, online article published Oct. 24, 2014. https://www.engadget.com/2014/10/24/google-exec-alan-eustace-stratex-high-altitude-jump/.
Logan, M.: "Flight Brings Us Closer to Balloon-Powered Space Tourism", online article dated Feb. 3, 2015. http://www.wired.com/2015/03/parafoil-world-view/.
Markoff, J.: "Parachutist's Record Fall: Over 25 Miles in 15 Minutes", The New York Times, online article published Oct. 24, 2014. http://www.nytimes.com/2014/10/25/science/alan-eustace-jumps-from-stratosphere-breaking-felix-baumgartners-world-record.html?_r=1.
Moon, M.: "World View Tests a Small Version of Its Balloon-powered Spacecraft," MSN News, online article dated Oct. 27, 2015. http://www.msn.com/en-us/news/technology/world-view-tests-a-small-version-of-its-balloon-powered-spacecraft/ar-BBmtkdA.
New Atlas: "Google exec sets new high-altitude skydiving world record", New Atlas, online article published Oct. 26, 2014. http://newatlas.com/alan-eustace-world-record-skydive-stratex/34423/pictures.
NuancedAdmin—Paragon: "Paragon Completes Record-Breaking Near-Space Dive Via High-Altitude Balloon", Paragon Space Development Corporation, press release dated Oct. 20, 2015.
O'Callaghan, J.: "Balloon Capsule That Will Take People to the Edge of Space Completes Test Flight," IflScience!, online article dated Oct. 28, 2015. http://www.iflscience.com/space/balloon-will-take-people-edge-space-capsule-completes-test-flight/.
Photograph of a parafoil in high altitude flight (assumed to be prior art, but applicant reserves right to confirm actual date of photograph and to dispute status as prior art).
World View: "Landmark Space Dive Sets Stage for World View Space Flights", World View, press release dated Oct. 24, 2014.
World View: "Major World View Test Flight Readies the Company to Begin Full Scale Flight Testing for Human Private Spaceflights", World View, press release dated Oct. 26, 2015.
World View: "Oct. 24, 2015 Milestone 10% Scale Test Flight", YouTube, published Oct. 24, 2015 (footage of parafoil seen in video), video can be accessed at https://www.youtube.com/watch?v=1-PpJHKHAQc.
World View: "World View Breaks World Record with Successful Test Flight for 2016 Journeys to Edge of Space", World View, press release dated Jun. 24, 2014.
World View: "World View Breaks World Record with Successful Test Flight", YouTube, published Jun. 23, 2014 (footage of parafoil in space seen in video), video can be accessed at https://www.youtube.com/watch?v=sdsVwN-ICX8.
World View: "World View One Step Closer to Manned Near-Space Voyages with Record-Breaking Flight", World View, press release dated Feb. 20, 2015.
International Search Report and Written Opinion in International Application PCT/US2016/021635, mailed Jun. 16, 2016.
Bil, C.: "Lighter-Than-Air Stationary Observation Platforms", 15th Australian International Aerospace Congress (AIAC15), Feb. 2013, pp. 97-103.
Cherry, N. J. et al.: "Characteristics and Performance of Three Low-Cost Superpressure Balloon (Tetroon) Systems", Journal of Applied Meteorology, vol. 10, 1971, pp. 982-990.
Epley, L.E: "A System Architecture for Long Duration Free Floating Flight for Military Applications", Cirrus Aerospace Corporation, Aug. 31, 1990, in 65 pages.
Jones, J.: "Long-Life Stratospheric Balloon System With Altitude Control", NASA Tech Briefs, online article posted Jan. 1, 2002. http://www.techbriefs.com/component/content/article/ntb/tech-briefs/physical-sciences/2248.
Lachenmeier, T.T. "Design of a Trans-Global Manned Balloon System With Relevance to Scientific Ballooning", American Institute of Aeronautics and Astronautics, Inc., DOI: 10.2514/6.1991-3687, Oct. 1991.
Longhetto, A.: "Some Improvements in the Balanced Pilot Balloons Technique", Atmospheric Environment Pergamon Press, vol. 5, 1971, pp. 327-331.
Nobuyuki, Yajima, et al: "Dual Balloon Systems", Scientific Ballooning: Technology and Applications of Exploration Balloons Floating in the Stratosphere and the Atmospheres of Other Planets. Springer Science & Business Media, Apr. 2009, pp. 48-52 (via Google Books). https://books.google.com.sg/books?id=_iEHI7Nh6yYC&lpg=PA51&dq=(super%20pressure%20and%20zero%20pressure%20balloon)%20(tandem%20OR%20buoyant)&pg=PR1#v=onepage&q=(super%20pressure%20and%20zero%20pressure%20balloon)%20(tandem%20OR%20buoyant)&f=false.
Noor, A. et al.: "Stratospheric Aircraft", Future Aeronautical and Space Systems. American Institute of Aeronautics and Astronautics, Inc., vol. 172, 1997, p. 241 (via Google Books). https://books.google.com.sg/books?id=uuR5yBwvhsQC&lpg=PA241&dq=(super%20pressure%20and%20zero%20pressure%20balloon)%20(tandem%20OR%20buoyant)&pg=PA241#v=onepage&q=(super%20pressure%20and%20zero%20pressure%20balloon)%20(tandem%20OR%20buoyant)&f=false.
Red Bull Stratos: "High Altitude Balloon", Red Bull Stratos, [date posted unknown], accessed online on Jul. 1, 2016. http://www.redbullstratos.com/technology/high-altitude-balloon/.
Saito, Y. et al.: "Properties of tandem balloons connected by extendable suspension wires", Advances in Space Research, vol. 45., 2010, pp. 482-489.
Saito, Y. et al: "Development of a tandem balloon system with a super-pressure balloon and a zero-pressure balloon I", JAXA Research and Development Report, Japan Aerospace Exploration Agency, JAXA-RR-11-008, Mar. 2012, in 16 pages.
Saito, Y. et al: "Development of a tandem balloon system with a super-pressure balloon and a zero-pressure balloon II", JAXA Research and Development Report, Japan Aerospace Exploration Agency, JAXA-RR-13-011, Mar. 2014, in 36 pages.
Smith, M.S. et al.: "Optimum Designs for Superpressure Balloons", Advances in Space Research, vol. 33, Iss. 10, Dec. 2004, in 9 pages.
Stratocat: "News Archive—Jun. 2012", StratoCat, page generated Aug. 2, 2015. http://stratocat.com.ar/news0612e.htm.
Wikipedia: "Sky anchor", Wikipedia, accessed May 21, 2016, in 1 page. https://en.wikipedia.org/wiki/Sky_anchor.
U.S. Appl. No. 15/065,828, filed Mar. 9, 2016 (Unpublished, projected publication is Sep. 15, 2016).
U.S. Appl. No. 15/189,850, filed Jun. 22, 2016 (Unpublished, projected publication is Oct. 13, 2016).

\* cited by examiner

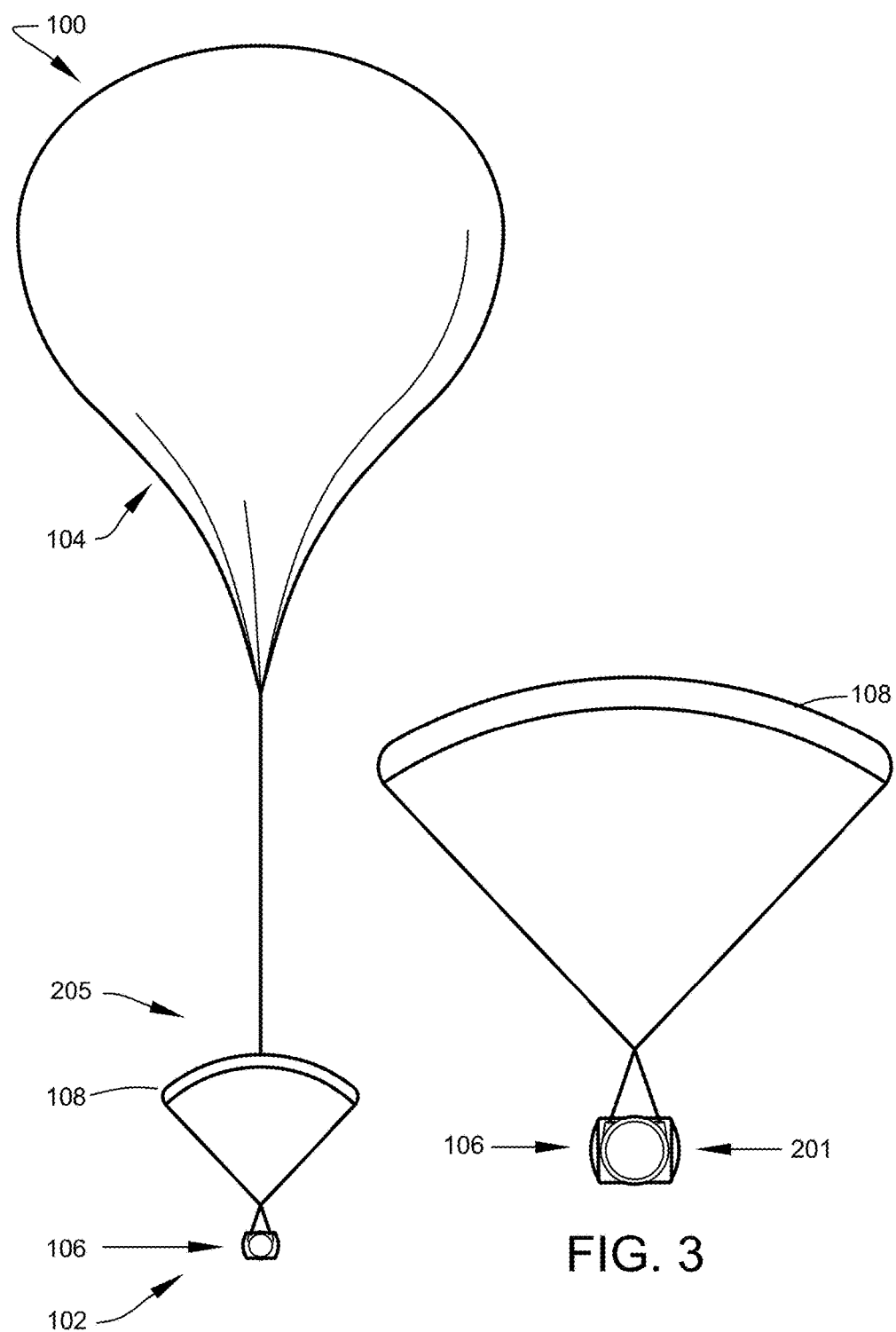

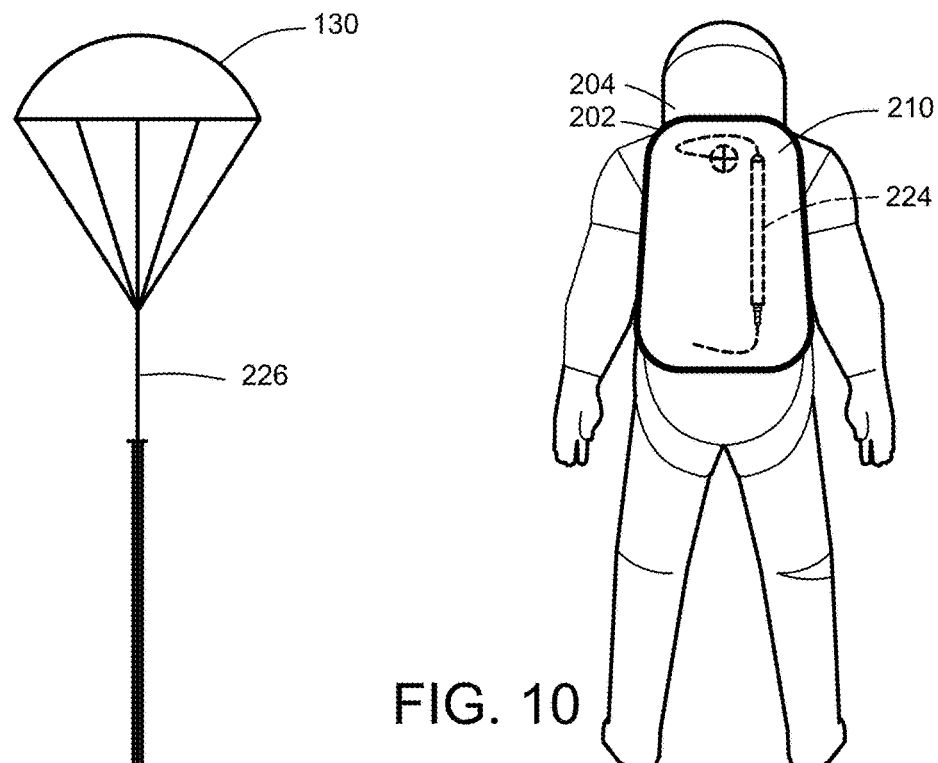
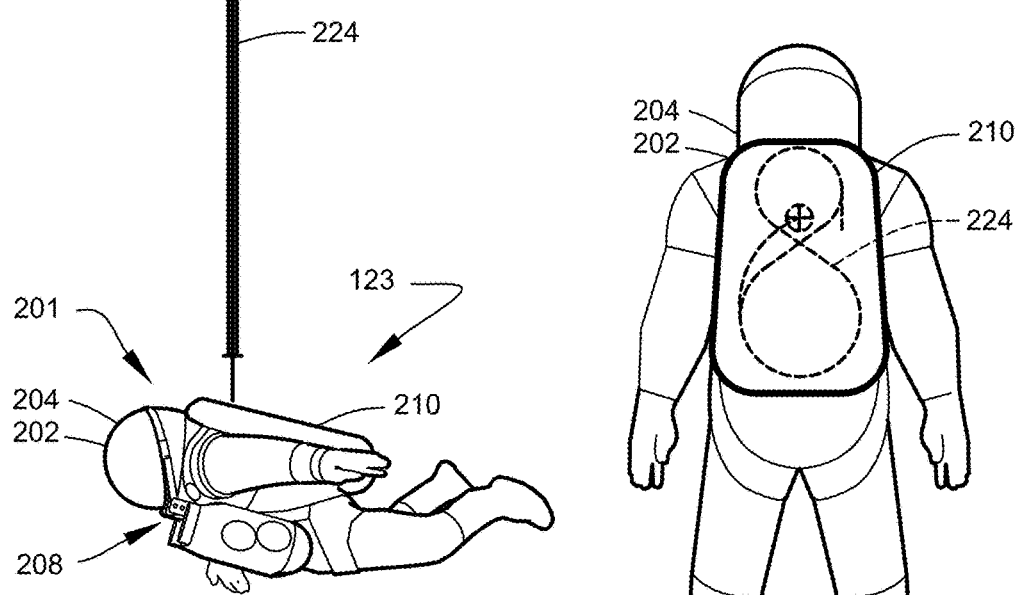
FIG. 9
FIG. 10
FIG. 11

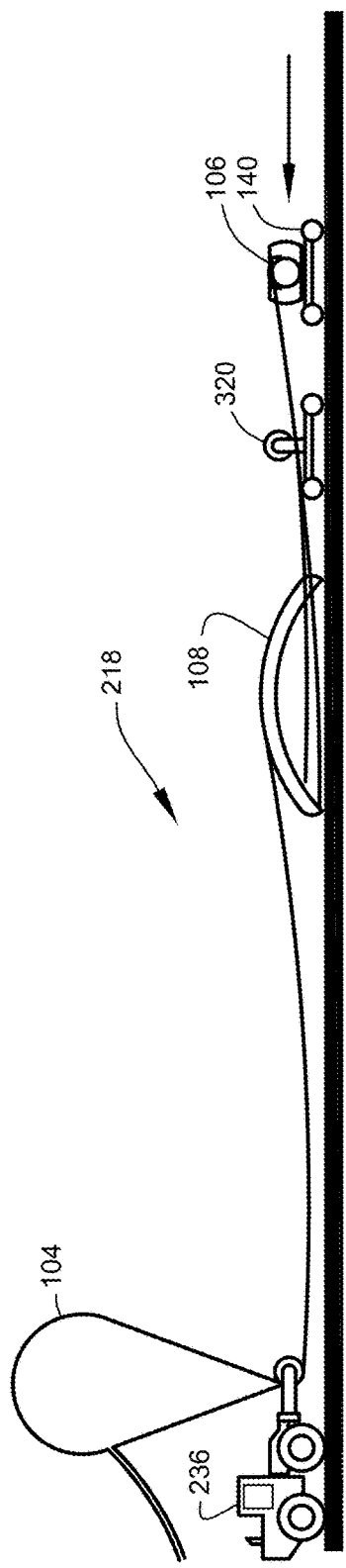
FIG. 13A
FIG. 13B

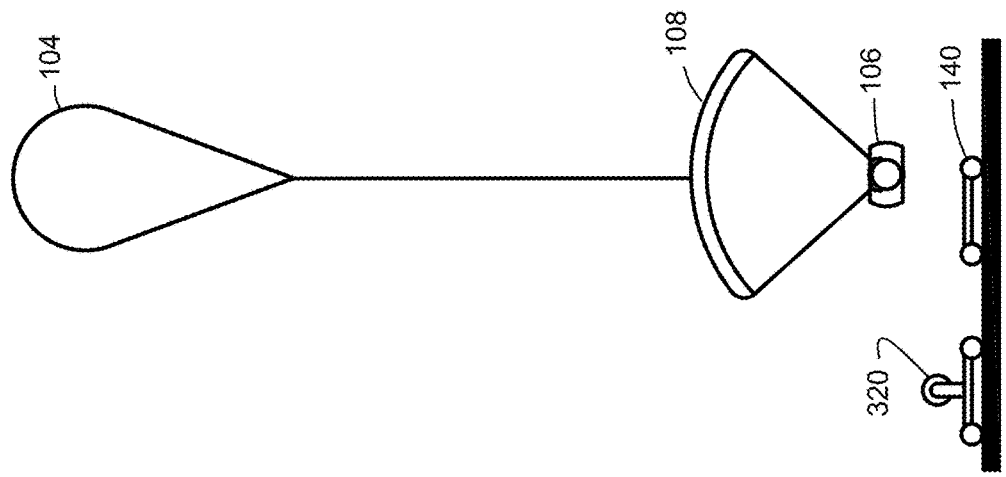
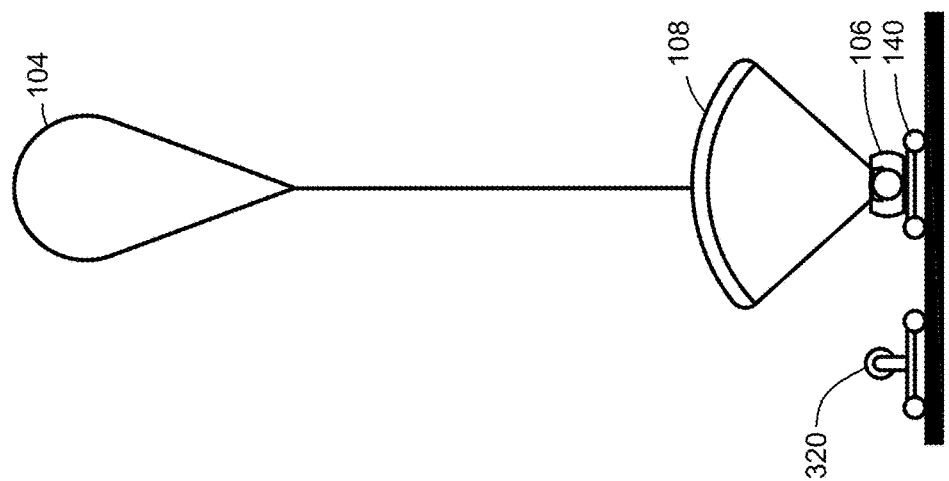
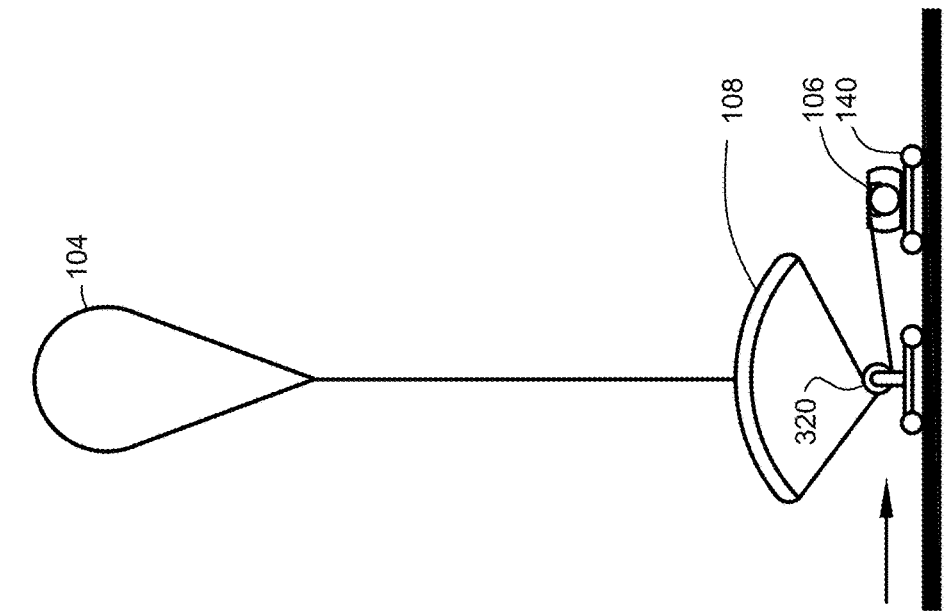

NEAR-SPACE OPERATION SYSTEMS

CROSS-REFERENCE TO RELATED APPLICATION

The present application is related to and claims priority from prior provisional application Ser. No. 61/768,183, filed Feb. 22, 2013, entitled "NEAR-SPACE OPERATION SYSTEMS"; and, this application is related to and claims priority from prior provisional application Ser. No. 61/813,918, filed Apr. 19, 2013, entitled "NEAR-SPACE OPERATION SYSTEMS"; and, this application is related to and claims priority from prior provisional application Ser. No. 61/822,355, filed May 11, 2013, entitled "NEAR-SPACE OPERATION SYSTEMS", the contents of all of which are incorporated herein by this reference and are not admitted to be prior art with respect to the present invention by the mention in this cross-reference section.

BACKGROUND

This invention relates to providing a system for high altitude and near-space operations. More particularly, this invention relates to providing a system enabling safe manned and unmanned operations at extremely high altitudes (above about 70,000 feet). Even more particularly, this invention relates to providing such systems enabling stratospheric visits. And even more particularly, this invention relates to providing such systems enabling stratospheric visits using lighter-than-air vehicles.

There is increasing interest in technologies enabling high altitude and near space access for tourism, research, education and other scientific and commercial pursuits. As the introduction of the airplane, the computer, and the internet proved, making new regions of our planet accessible can bring about revolutionary scientific, social, and economic advances. A need exists for new technologies providing safe, low-cost, access to high altitude and near-space regions of the Earth's atmosphere.

OBJECTS AND FEATURES OF THE INVENTION

A primary object and feature of the present invention is to provide a system addressing the above-mentioned need(s). It is a further object and feature of the present invention to provide such a system enabling safe manned and unmanned operations at extremely high altitudes (above 70,000 feet). It is a further object and feature of the present invention to provide such a system enabling stratospheric visits using lighter-than-air vehicles. It is another object and feature of the present invention to provide such a system enabling a multi-crew, multi-passenger vehicle utilizing balloon accent and parawing recovery. It is a further object and feature of the present invention to provide such a system enabling "shirt-sleeve" crew/passenger operation.

It is another object and feature of the present invention to provide such a system enabling ultra-high altitude parachute/parawing primary and/or secondary recovery utilizing stabilized (stiffened) drogue parachute deployment. A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a stratospheric-visit system, relating to a stratospheric visit using lighter-than-air travel, comprising: a payload system structured and arranged to provide at least one payload including at least one human, and at least one parachute system; a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and a parachute pre-deploying system structured and arranged to deploy, prior to the launch of the at least one payload, such parachute system.

Moreover, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

Additionally, it provides such a stratospheric-visit system wherein such distance separating means comprises anti-tangling means for assisting prevention of tangling of such coupling means with the at least one payload. Also, it provides such a stratospheric-visit system wherein such distance separating means comprises burble-confine penetrator means for assisting such parachute system to penetrate at least one burble confine during deployment of such parachute system. In addition, it provides such a stratospheric-visit system: wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

And, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Further, it provides such a stratospheric-visit system further comprising: a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions. Even further, it provides such a stratospheric-visit system wherein such payload support system is further structured and arranged to be separated, during launch of the at least one payload, from the at least one payload.

Moreover, it provides such a stratospheric-visit system wherein such parachute system comprises at least one parafoil. Additionally, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Also, it provides such a stratospheric-visit system wherein such distance separating means comprises anti-tangling means for assisting prevention of tangling of such coupling means with the at least one payload.

In addition, it provides such a stratospheric-visit system wherein such distance separating means comprises burble-confine penetrator means for assisting such parachute system to penetrate at least one burble confine during deployment of such parachute system. And, it provides such a stratospheric-visit system: wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

Further, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Even further, it provides such a stratospheric-visit system further comprising: a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions.

Moreover, it provides such a stratospheric-visit system wherein such payload support system is further structured and arranged to be separated, during launch of the at least one payload, from the at least one payload. Additionally, it provides such a stratospheric-visit system wherein such parachute system comprises at least one drogue chute. Also, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

In addition, it provides such a stratospheric-visit system wherein such distance separating means comprises anti-tangling means for assisting prevention of tangling of such coupling means with the at least one payload. And, it provides such a stratospheric-visit system wherein such distance separating means comprises burble-confine penetrator means for assisting such parachute system to penetrate at least one burble confine during deployment of such parachute system.

Further, it provides such a stratospheric-visit system: wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

Even further, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Moreover, it provides such a stratospheric-visit system further comprising: a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions. Additionally, it provides such a stratospheric-visit system wherein such payload support system is further structured and arranged to be separated, during launch of the at least one payload, from the at least one payload.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

Also, it provides such a stratospheric-visit system wherein such distance separating means comprises anti-tangling means for assisting prevention of tangling of such coupling means with the at least one payload. In addition, it provides such a stratospheric-visit system wherein such distance separating means comprises burble-confine penetrator means for assisting such parachute system to penetrate at least one burble confine during deployment of such parachute system.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions.

And, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Further, it provides such a stratospheric-visit system wherein such distance separating means comprises anti-tangling means for assisting prevention of tangling of such coupling means with the at least one payload.

Even further, it provides such a stratospheric-visit system wherein such distance separating means comprises burble-confine penetrator means for assisting such parachute system to penetrate at least one burble confine during deployment of such parachute system. Moreover, it provides such a stratospheric-visit system: wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

Additionally, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Also, it provides such a stratospheric-visit system wherein such payload support system is further structured and arranged to be separated, during launch of the at least one payload, from the at least one payload.

In addition, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. And, it provides such a stratospheric-visit system wherein such distance separating means comprises anti-tangling means for assisting prevention of tangling of such coupling means with the at least one payload.

Further, it provides such a stratospheric-visit system wherein such distance separating means comprises burble-confine penetrator means for assisting such parachute system to penetrate at least one burble confine during deployment of such parachute system. Even further, it provides such a stratospheric-visit system: wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

Moreover, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and wherein such tethering system comprises at least one lift-resisting ground restraint structured and arranged to resist upward lift imparted by such lighter-than-air propulsion system at least one balloon-to-restraint coupler structured and arranged to couple such lighter-than-air propulsion system to such at least one lift-resisting ground restraint; at least one payload coupler structured and arranged to couple the at least one payload to such at least one balloon-to-restraint coupler; wherein such un-tethering system comprises at least one restraint-decoupling system structured and arranged to decouple such at least one balloon-to-restraint coupler from such at least one lift-resisting ground restraint, wherein the at least one payload, after decoupling such at least one balloon-to-restraint coupler from such at least one lift-resisting ground restraint, remains coupled to such lighter-than-air propulsion system by such at least one balloon-to-restraint coupler.

Further, it provides such a stratospheric-visit system wherein the at least one payload launches with such lighter-than-air propulsion system. Additionally, it provides such a stratospheric-visit system wherein such payload system comprises a stratospheric-visit vehicle structured and arranged to transport multiple humans on the stratospheric visit; and wherein such stratospheric-visit vehicle comprises seating structured and arranged to serve the multiple humans environmental control structured and arranged to serve the multiple humans during a multiple hour stratospheric visit visual access structured and arranged to provide the multiple humans with viewing of Earth.

Also, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

In addition, it provides such a stratospheric-visit system wherein such distance separating means comprises anti-tangling means for assisting prevention of tangling of such coupling means with the at least one payload. And, it provides such a stratospheric-visit system wherein such distance separating means comprises burble-confine penetrator means for assisting such parachute system to penetrate at least one burble confine during deployment of such parachute system.

Further, it provides such a stratospheric-visit system wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

Even further, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Moreover, it provides such a stratospheric-visit system further comprising a parachute pre-deploying system structured and arranged to deploy, prior to the launch of the at least one payload, such parachute system.

Additionally, it provides such a stratospheric-visit system wherein such parachute system comprises at least one parafoil. Also, it provides such a stratospheric-visit system wherein such parachute system comprises at least one drogue chute. In addition, it provides such a stratospheric-visit system further comprising: a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions. And, it provides such a stratospheric-visit system wherein such payload support system is further structured and arranged to be separated, during launch of the at least one payload, from the at least one payload.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human; wherein such rigid adapter comprises at least one size adjuster structured and arranged to adjust dimensions of such rigid adapter to the front of the torso of the at least one human prior to launch; wherein such rigid adapter further comprises at least one oxygen-supply mount structured and arranged to be attached to an oxygen supply; and wherein the oxygen supply is positionable to be transported along the front torso of the at least one human.

Further, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Even further, it provides such a stratospheric-visit system wherein such distance separating means comprises anti-tangling means for assisting prevention of tangling of such coupling means with the at least one payload. Moreover, it provides such a stratospheric-visit system wherein such distance separating means comprises burble-confine penetrator means for assisting such parachute system to penetrate at least one burble confine during deployment of such parachute system.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and wherein such payload system comprises a stratospheric-visit vehicle structured and arranged to transport multiple humans on the stratospheric visit; wherein such stratospheric-visit vehicle comprises seating structured and arranged to serve the multiple humans, environmental control structured and arranged to serve the multiple humans during a multiple hour stratospheric visit, and visual access structured and arranged to provide the multiple humans with viewing of Earth.

Additionally, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Also, it provides such a stratospheric-visit system wherein such distance separating means comprises anti-tangling means for assisting prevention of tangling of such coupling means with the at least one payload. In addition, it provides such a stratospheric-visit system wherein such distance separating means comprises burble-confine penetrator means for assisting such parachute system to penetrate at least one burble confine during deployment of such parachute system.

And, it provides such a stratospheric-visit system: wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human.

Further, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

Even further, it provides such a stratospheric-visit system further comprising: a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions.

Moreover, it provides such a stratospheric-visit system wherein such payload support system is further structured and arranged to be separated, during launch of the at least one payload, from the at least one payload. Additionally, it provides such a stratospheric-visit system further comprising a parachute pre-deploying system structured and arranged to deploy, prior to the launch of the at least one payload, such parachute system. Also, it provides such a stratospheric-visit system wherein such parachute system comprises at least one parafoil. In addition, it provides such a stratospheric-visit system wherein such parachute system comprises at least one drogue chute.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and deploying, prior to the step of launching, the parachute system.

And, it provides such a stratospheric-visit method wherein the parachute system comprises at least one parafoil system. Further, it provides such a stratospheric-visit method wherein the parachute system comprises at least one drogue system.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and coupling the parachute system within the at least one payload; distance-separating the parachute system from the at least one payload; and controlling compressive resistance of the distance separation of the parachute system from the at least one payload; wherein controlling distance separation of such parachute system from the at least one payload is achieved.

Even further, it provides such a stratospheric-visit method wherein the step of distance-separating comprises the step of assisting prevention of tangling of the parachute system with the at least one payload. Even further, it provides such a stratospheric-visit method wherein the step of distance-separating comprises the step of assisting the parachute system to penetrate at least one burble confine during deployment of the parachute system.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and assisting traversing of at least the at least one human across the ground; supporting, during launch, at least the at least one human, wherein the step of supporting comprises the steps of minimizing injury, during launch, to at least the at least one human and at least one accompanying human life support environment, conforming support to at least the at least one human and the at least one accompanying human life support environment, cushioning at least the at least one human and the at least one accompanying human life support environment, and permitting movement in both rotational and translational directions. Even further, it provides such a stratospheric-visit method further comprising the step of terminating the step of supporting, during launch of the at least one payload.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and wherein the step of tethering comprises the steps of coupling the lighter-than-air propulsion system to at least one lift-resisting ground restraint with at least one balloon-to-restraint coupler; coupling the at least one payload to the at least one balloon-to-restraint coupler; wherein the step of un-tethering comprises the step of decoupling the at least one balloon-to-restraint coupler from the at least one lift-resisting ground restraint, wherein the at least one payload, after the step of decoupling the at least one balloon-to-restraint coupler from the at least one lift-resisting ground restraint, remains coupled to the lighter-than-air propulsion system. wherein the at least one payload launches with the lighter-than-air propulsion system.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and wherein the step of controlling at least one human life support environment comprises the steps of coupling at least one equipment controller to a torso of the at least one human, providing a rigid adapter to closely abut a front of the torso of the at least one human, adjusting dimensions of the rigid adapter to fit the front of the torso of the at least one human prior to launch, rigidly attaching a mount, to attach an oxygen supply, to the rigid adapter, and wherein the oxygen supply is positionable to be transported along the front torso of the at least one human.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and providing a stratospheric-visit vehicle to transport multiple humans on the stratospheric visit; wherein the step of providing the stratospheric-visit vehicle comprises the steps of providing seating to serve the multiple humans, providing the at least one human life support environment to serve the multiple humans during a multiple hour stratospheric visit, and providing visual access to serve the multiple humans with viewing of Earth.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and a parachute deploying system structured and arranged to deploy, prior to the launch of the at least one payload, such parachute system. Moreover, it provides such a stratospheric-visit system wherein such parachute system comprises at least one parafoil. Additionally, it provides such a stratospheric-visit system wherein such parachute system comprises at least one drogue chute.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

Also, it provides such a stratospheric-visit system wherein such distance separating means comprises anti-tangling means for assisting prevention of tangling of such coupling means with the at least one payload. In addition, it provides such a stratospheric-visit system wherein such distance separating means comprises burble-confine penetrator means for assisting such parachute system to penetrate at least one burble confine during deployment of such parachute system. In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions.

Additionally, it provides such a stratospheric-visit system wherein such payload support system is further structured and arranged to be separated, during launch of the at least one payload, from the at least one payload. In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and wherein such tethering system comprises at least one lift-resisting ground restraint structured and arranged to resist upward lift imparted by such lighter-than-air propulsion system at least one balloon-to-restraint coupler structured and arranged to couple such lighter-than-air propulsion system to such at least one lift-resisting ground restraint; at least one payload coupler structured and arranged to couple the at least one payload to such at least one balloon-to-restraint coupler; wherein such un-tethering system comprises at least one restraint-decoupling system structured and arranged to decouple such at least one balloon-to-restraint coupler from such at least one lift-resisting ground restraint, wherein the at least one payload, after decoupling such at least one balloon-to-restraint coupler from such at least one lift-resisting ground restraint, remains coupled to such lighter-than-air propulsion system by such at least one balloon-to-restraint coupler, wherein the at least one payload launches with such lighter-than-air propulsion system.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human; wherein such rigid adapter comprises at least one size adjuster structured and arranged to adjust dimensions of such rigid adapter to the front of the torso of the at least one human prior to launch; wherein such rigid adapter further comprises at least one oxygen-supply mount structured and arranged to be attached to an oxygen supply; and wherein the oxygen supply is positionable to be transported along the front torso of the at least one human.

In accordance with another preferred embodiment hereof, this invention provides a stratospheric-visit system, relating to a stratospheric visit using lighter-than-air travel, comprising: a payload system structured and arranged to provide at least one payload including at least one human, and at least one parachute system; and a launch system structured and arranged to launch the at least one payload; wherein such launch system comprises a lighter-than-air propulsion system structured and arranged to lighter-than-air-propel the at least one payload, a tethering system structured and arranged to tether, initially to ground, such lighter-than-air propulsion system, and an un-tethering system structured and arranged to un-tether, from the ground, such lighter-than-air propulsion system; and an environmental control system structured and arranged to control, during the stratospheric visit, at least one human-life-support environment of the at least one human; a travel control system structured and arranged to control, in the stratospheric visit, travel of the at least one payload; a communication system structured and arranged to communicate within such stratospheric-visit system; and a recovery system structured and arranged to recover at least the at least one human; wherein such recovery system comprises a separator system structured and arranged to perform separation of at least the at least one human from such lighter-than-air propulsion system, the parachute system structured and arranged to decelerate at least the at least one human after the separation of at least the at least one human from such lighter-than-air propulsion system, and a landing system structured and arranged to assist landing of at least the at least one human; and wherein such payload system comprises a stratospheric-visit vehicle structured and arranged to transport multiple humans on the stratospheric visit; wherein such stratospheric-visit vehicle comprises seating structured and arranged to serve the multiple humans, environmental control structured and arranged to serve the multiple humans during a multiple hour stratospheric visit, and visual access structured and arranged to provide the multiple humans with viewing of Earth.

Further, it provides such a stratospheric-visit system wherein such payload system comprises a stratospheric-visit vehicle structured and arranged to transport multiple humans on the stratospheric visit; and wherein such stratospheric-visit vehicle comprises seating structured and arranged to serve the multiple humans environmental control structured and arranged to serve the multiple humans during a multiple hour stratospheric visit visual access structured and arranged to provide the multiple humans with viewing of Earth. Even further, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved. Moreover, it provides such a stratospheric-visit system wherein such distance separating means comprises anti-tangling means for assisting prevention of tangling of such coupling means with the at least one payload. Additionally, it provides such a stratospheric-visit system wherein such distance separating means comprises burble-confine penetrator means for assisting such parachute system to penetrate at least one burble confine during deployment of such parachute system. Also, it provides such a stratospheric-visit system wherein at least portions of such environmental control system and such communication system comprise at least one equipment module; wherein such at least one equipment module comprises a torso-coupling system structured and arranged to couple such at least one equipment module to a torso of the at least one human; wherein such torso-coupling system comprises a rigid adapter structured and arranged to closely abut a front of the torso of the at least one human wherein such rigid adapter comprises at least one size adjuster structured and arranged to adjust dimensions of such rigid adapter to the front of the torso of the at least one human prior to launch wherein such rigid adapter further comprises at least one oxygen-supply mount structured and arranged to be attached to an oxygen supply wherein the oxygen-supply is positionable to be transported along the front torso of the at least one human. In addition, it provides such a stratospheric-visit system further comprising: a payload ground-traversing system structured and arranged to assist traversing of at least the at least one human across the ground; wherein such payload ground-traversing system comprises a payload support system structured and arranged to support, during launch, at least the at least one human, wherein such payload support system comprises an injury-minimizing system structured and arranged to minimize injury, during launch, to at least the at least one human and at least one accompanying such environmental control system, wherein such injury-minimizing system comprises at least one configuration structured and arranged to conform to at least the at least one human and at least one accompanying such environmental control system, wherein such injury-minimizing system comprises at least one cushioning structured and arranged to cushion at least the at least one human and the at least one accompanying such environmental control system, and wherein such payload support system comprises a motion direction system structured and arranged to move in both rotational and translational directions. And, it provides such a stratospheric-visit system wherein such payload support system is further structured and arranged to be separated, during launch of the at least one payload, from the at least one payload. Further, it provides such a stratospheric-visit system further comprising a parachute deploying system structured and arranged to deploy, prior to the launch of the at least one payload, such parachute system. Even further, it provides such a stratospheric-visit system wherein such parachute system comprises at least one parafoil. Moreover, it provides such a stratospheric-visit system wherein such parachute system comprises at least one drogue chute. Additionally, it provides such a stratospheric-visit system further comprising: coupling means for coupling such parachute system within the at least one payload; wherein such coupling means comprises distance separating means for distance-separating such parachute system from the at least one payload; and wherein such distance separating means comprises compressive-resistance control means for controlling compressive resistance of such distance separating means to assist the distance separation of such parachute system from the at least one payload; wherein controlling distance separation of such parachute system from the at least one payload is achieved.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and deploying, prior to the step of launching, the parachute system. Also, it provides such a method wherein the parachute system comprises at least one parafoil system.

In addition, it provides such a method wherein the parachute system comprises at least one drogue system. In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and coupling the parachute system within the at least one payload; distance-separating the parachute system from the at least one payload; and controlling compressive resistance of the distance separation of the parachute system from the at least one payload; wherein controlling distance separation of such parachute system from the at least one payload is achieved. And, it provides such a stratospheric-visit method wherein the step of distance-separating comprises the step of assisting prevention of tangling of the parachute system with the at least one payload.

Further, it provides such a stratospheric-visit method wherein the step of distance-separating comprises the step of assisting the parachute system to penetrate at least one burble confine during deployment of the parachute system.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and assisting traversing of at least the at least one human across the ground; supporting, during launch, at least the at least one human, wherein the step of supporting comprises the steps of minimizing injury, during launch, to at least the at least one human and at least one accompanying human life support environment, conforming support to at least the at least one human and the at least one accompanying human life support environment, cushioning at least the at least one human and the at least one accompanying human life support environment, and permitting movement in both rotational and translational directions. Even further, it provides such a stratospheric-visit method further comprising the step of terminating the step of supporting, during launch of the at least one payload. In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and wherein the step of tethering comprises the steps of coupling the lighter-than-air propulsion system to at least one lift-resisting ground restraint with at least one balloon-to-restraint coupler; coupling the at least one payload to the at least one balloon-to-restraint coupler; wherein the step of un-tethering comprises the step of decoupling the at least one balloon-to-restraint coupler from the at least one lift-resisting ground restraint, wherein the at least one payload, after the step of decoupling the at least one balloon-to-restraint coupler from the at least one lift-resisting ground restraint, remains coupled to the lighter-than-air propulsion system, wherein the at least one payload launches with the lighter-than-air propulsion system.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and wherein the step of controlling at least one human life support environment comprises the steps of coupling at least one equipment controller to a torso of the at least one human, providing a rigid adapter to closely abut a front of the torso of the at least one human, adjusting dimensions of the rigid adapter to fit the front of the torso of the at least one human prior to launch, rigidly attaching a mount, to attach an oxygen supply, to the rigid adapter, and wherein the oxygen supply is positionable to be transported along the front torso of the at least one human.

In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and providing a stratospheric-visit vehicle to transport multiple humans on the stratospheric visit; wherein the step of providing the stratospheric-visit vehicle comprises the steps of providing seating to serve the multiple humans, providing the at least one human life support environment to serve the multiple humans during a multiple hour stratospheric visit, and providing visual access to serve the multiple humans with viewing of Earth.

In accordance with a preferred embodiments hereof, this invention provides each and every novel feature, element, combination, step and/or method disclosed or suggested by this patent application.

BRIEF DESCRIPTION OF THE DRAWINGS

FIG. 2 shows a schematic diagram, illustrating the preferred high-altitude operations apparatus, according to preferred systems of FIG. 1.

FIG. 3 shows a schematic diagram, illustrating the preferred high-altitude operations apparatus of FIG. 1, in a descent and recovery configuration, according to a preferred embodiment of the present invention.

FIG. 9 shows a preferred drogue parachute of single-pilot embodiments of the stratospheric-visit system, according to preferred apparatus and methods of the present invention.

FIG. 10 shows a diagrammatic rear view of a preferred stowed embodiment of the drogue parachute of FIG. 9.

FIG. 11 shows a diagrammatic rear view of another preferred stowed embodiment of the drogue parachute of FIG. 9.

FIG. 13A through FIG. 13E show a series of diagrams, illustrating a preferred launch procedure for the preferred high-altitude operations apparatus of FIG. 1, according to preferred apparatus and methods of the present invention.

DETAILED DESCRIPTION OF THE BEST MODES AND PREFERRED EMBODIMENTS OF THE INVENTION

The present disclosure describes Applicant's preferred system apparatus and implementation methods enabling manned stratospheric operations using lighter-than-air travel, (above about 70,000 feet). For descriptive clarity, the present invention will be generally identified herein as stratospheric-visit system 100. The initial section of the present disclosure will describe preferred aspects of near-space operations utilizing Applicant's preferred systems and methods. Subsequent sections will generally describe implementation of specific apparatus and methods relating to high-altitude delivery and recovery of multiple passengers and individual pilots between earth and the stratosphere.

Figure 1:
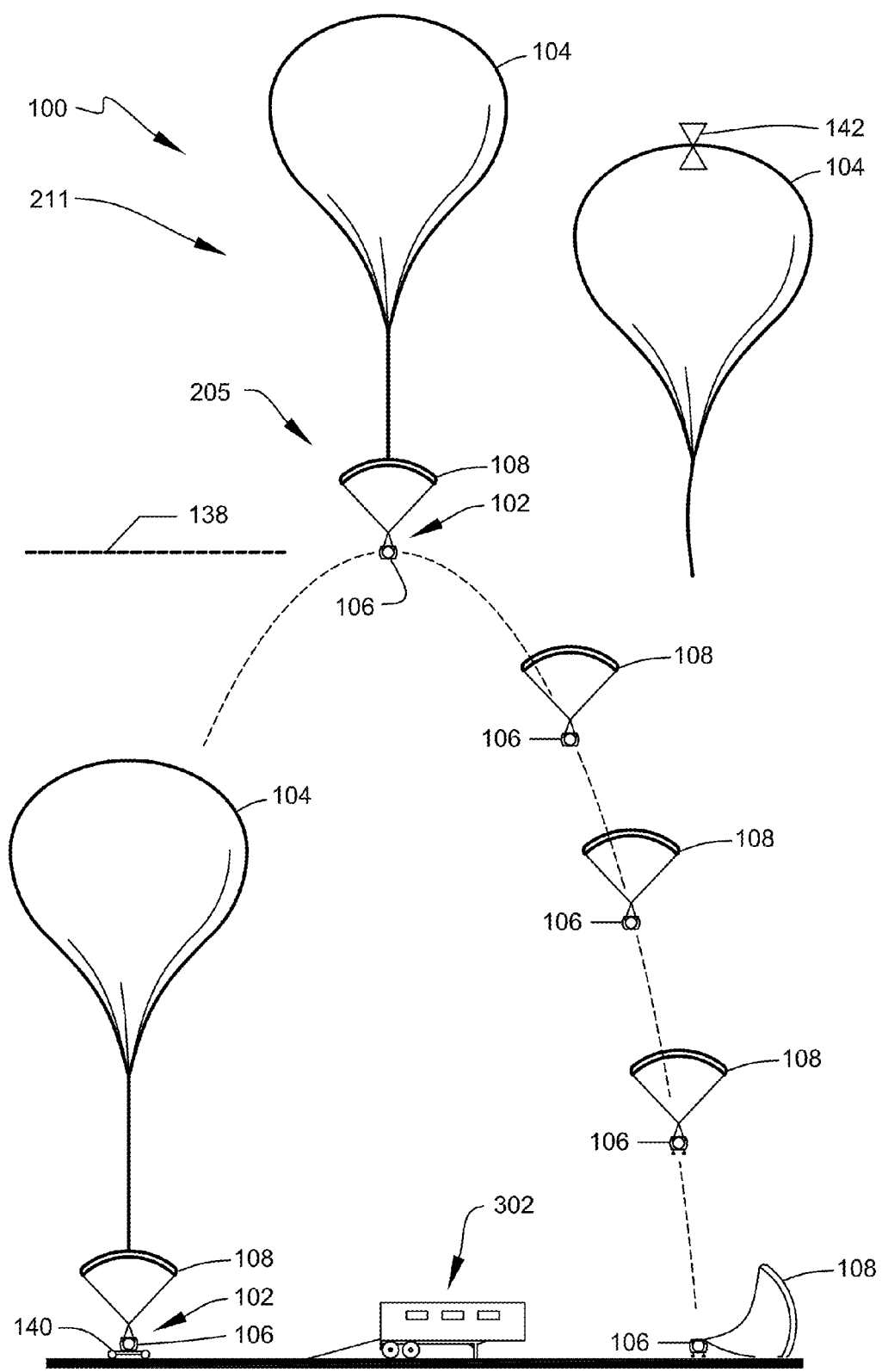
FIG. 1 shows a schematic diagram, illustrating a preferred flight of a preferred high-altitude operations apparatus, according to a preferred embodiment of the present invention.

In that regard, FIG. 1 is a schematic diagram, depicting a preferred representative flight of stratospheric-visit vehicle 102, according to a preferred embodiment of the present invention. Stratospheric-visit vehicle 102 (at least embodying herein wherein such payload system comprises a stratospheric-visit vehicle structured and arranged to go on the stratospheric visit) is preferably configured to transport multiple human passengers and crew members to the stratosphere, for example about 100,000 feet above the surface of the Earth, preferably using lighter-than-air propulsion. Lighter-than-air propulsion functions are preferably implemented by at least one balloon 104 that preferably is filled with at least one lighter-than-air gas, preferably helium. In a preferred flight, the crew and/or pilot preferably rise to a target altitude 138, for example, above about 125,000 feet above the earth, and preferably remain there for a predetermined duration. One preferred mission profile includes about a 90-minute ascent and flight duration of just over about two-hours (it is noted that longer flights are within the capability of the present system for science missions and special tours).

On descent, balloon 104 is released, and a pre-deployed parawing 108 is used to glide the vehicle to earth. Parawing 108 (at least embodying herein wherein the at least one payload launches with said lighter-than-air propulsion system and at least embodying herein wherein said parachute system comprises at least one parafoil) is preferably of a steerable design allowing a pilot to maneuver capsule 106 to a selected landing site.

After capsule 106 is released, balloon 104 is preferably deflated and brought to the ground to avoid it becoming an aviation hazard or falling into populated areas. This is preferably done with a ripping panel and line that are pulled when the payload is released. Additionally, balloon 104 is equipped with valve 142 at the top of the envelope that opens to release the helium gas.

Prior to launch, capsule 106 is preferably placed in a wheeled launch cradle 140 to enable towing of capsule 106 to the launch-site location. The wheeled launch cradle 140 also preferably enables translational and rotational movement of capsule 106 during release of balloon 104 at launch. Preferably, launch cradle 140 separates from capsule 106 and remains on the ground after liftoff. Additional details of Applicant's preferred launch procedures are presented in FIG. 13A through 13E.

FIG. 2 shows a schematic diagram, illustrating a preferred stratospheric-visit vehicle 102, according to preferred systems of FIG. 1. FIG. 3 shows a schematic diagram, illustrating the preferred stratospheric-visit vehicle 102 of FIG. 1, in a descent and recovery configuration, according to a preferred embodiment of the present invention.

Preferably, stratospheric-visit vehicle 102 comprises capsule 106, preferably a pressurized capsule, equipped with seating to serve multiple human passengers and crew, an Environmental Control and Life Support System (ECLSS) to maintain a habitable environment for the multiple humans during a multiple-hour stratospheric visit, and visual access (see, for example, FIGS. 14A and 14B) structured and arranged to provide the multiple humans with viewing of Earth. In addition, stratospheric-visit vehicle 102 preferably implements travel-control functions, communication functions, recovery functions, balloon-separator functions, landing functions, etc.

One preferred aspect of Applicant's near-space operation systems 100 is the ability of the recovery system to return the capsule/payload from extremely high altitude (above 70,000 ft) to the ground in a controlled fashion using parawing 108. The need for a parafoil design capable of operating above a 50,000-foot altitude and capable of providing a precision return and gentle landing (rather than random dropped return and landing under a conventional round or semi-round parachute) was a driving factor for Applicant's development of the presently-disclosed recovery arrangements.

The preferred design of parawing 108 differs from conventional parafoil parachute technology in that Applicant's wing remains fixed in a "flight-ready" configuration at launch through flight and return to earth. Parawing 108 preferably does not require moving air to maintain an aerodynamic shape; rather, the preferred wing design utilizes a stiffening system to maintain parawing 108 in the preferred flight-ready configuration during the assent phase of a mission. This precludes the need for the system to withstand dynamic deployment forces and removes the uncertainty of deployment actuation, unfurling, and proper deployment control. Preferred stiffening systems utilize rigidizing members forming a geometry-controlling framework. Stiffening members may comprise adapted equivalents of one or more ribs, spars, struts, braces, etc. Preferred stiffening members may also utilize tension members to transfer force loads within parawing 108. Alternately preferably, a stiffening frame composed of inflated cells is used.

Parawing 108 is preferably suspended from below the high-altitude balloon 104 and conformed to be fully deployed prior to release. The preferred use of a parawing 108 already deployed and in a near-flight configuration results in less of a "drop" feeling by the payload or passengers when released from balloon 104 (or other carrier). Furthermore, applicant's system allows for quick transition to controlled, directed flight. It is further noted that alternate preferred embodiments utilize an already descending balloon to further reduce the time from release to fully supported flight.

Parawing 108 preferably remains open, ready to glide capsule 106 to a safe landing at any time during the flight. This provides a significant safety feature if balloon 104 does not reach full altitude. In the unlikely event of a parawing failure, a drogue parachute and secondary parafoils are preferably deployed to provide backup recovery (see also FIG. 12).

Figure 4A:
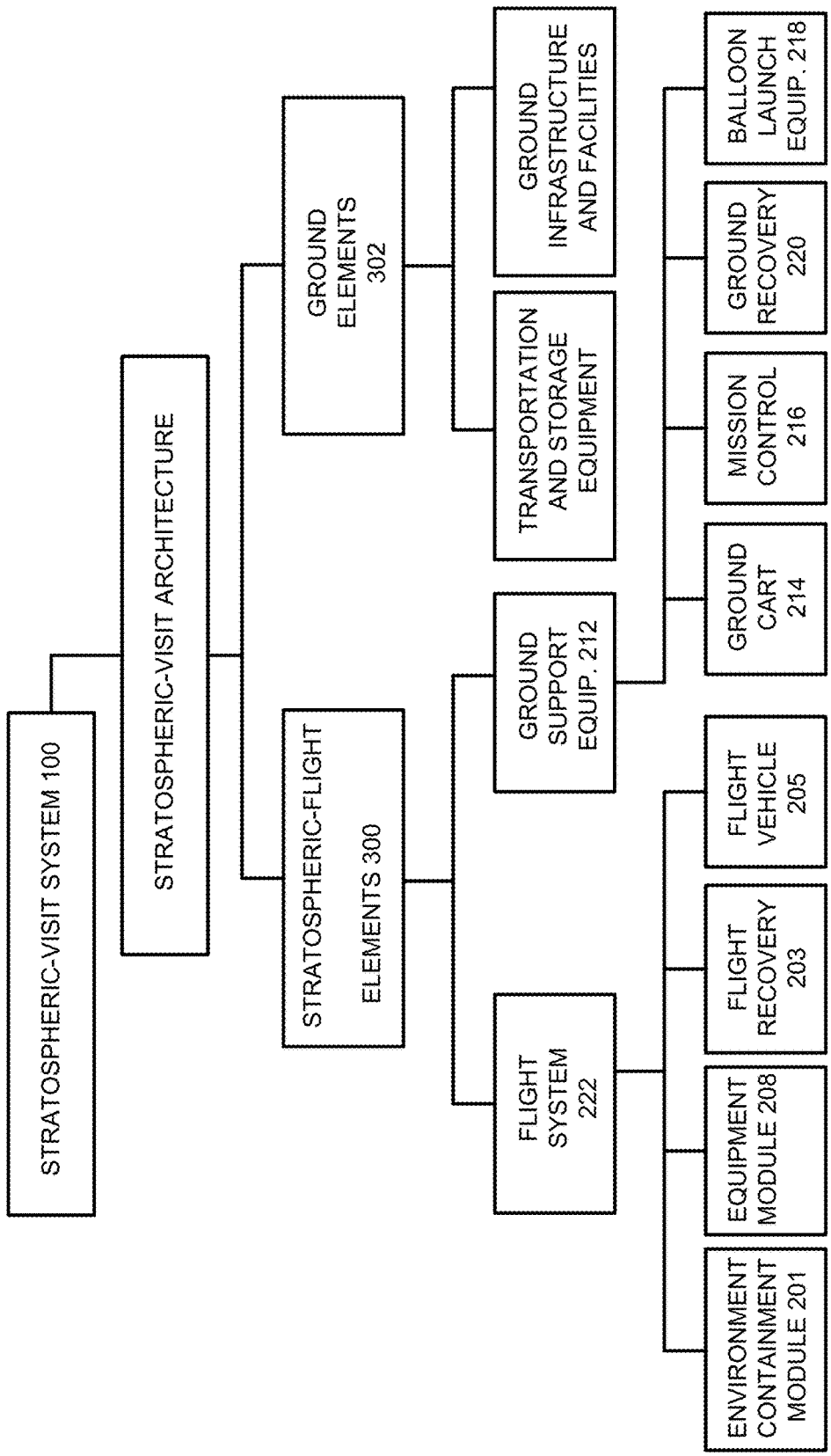
FIG. 4A shows a high-level organizational overview of a stratospheric-visit system, including preferred function-enabling subsystems, according to preferred embodiments of the present invention.
Figure 4B:
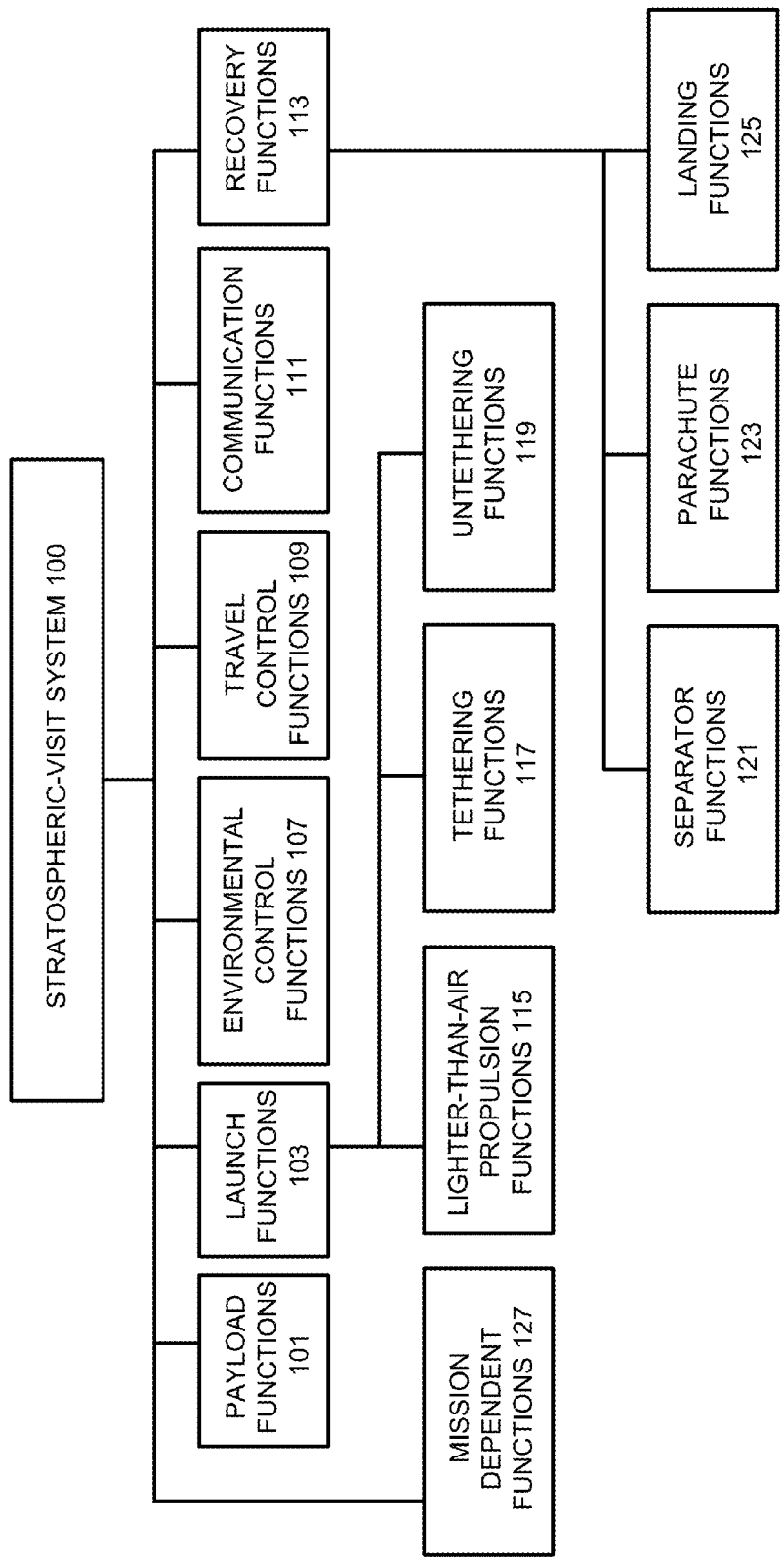
FIG. 4B shows a high-level organizational overview of a stratospheric-visit system, including preferred principal system functions, according to preferred embodiments of the present invention.

FIG. 4A shows a high-level organizational overview of stratospheric-visit system 100, including preferred function-enabling subsystems, according to preferred embodiments of the present invention. FIG. 4B shows a high-level organizational overview of stratospheric-visit system 100, including preferred principal system functions, according to preferred embodiments of the present invention.

Stratospheric-visit System 100 is preferably enabled by implementation of a set of essential system functions, which are preferably implemented by the enabling subsystems outlined in system organization chart of FIG. 4A. Referring first to the organizational diagram of FIG. 4A, Stratospheric-visit System Architecture of Stratospheric-visit System 100 preferably comprises Stratospheric-flight Elements 300 and Ground Elements 302, as shown. Preferably, Stratospheric-visit System 100 is further divided into Flight System 211 and Ground Support Equipment 212, each with four system modules. Environmental-containment Module 201 preferably functions to enclose and contain a habitable environment around the human passengers, crew, and/or single pilot during a mission. Preferred implementations of the Environmental-containment Module 201 are generally mission specific and preferably include pressure-containment capsules 106 (see FIG. 2), pressure suits 202 (see FIG. 6), along with various components of an Environmental Control and Life Support System (ECLSS).

Equipment Module 208 preferably provides a mounting location for components from a variety of subsystems. The Flight Recovery module 203 preferably includes a parachute mounting structure or body harness, main parachute and reserve parachute. In the present disclosure, the term "parachute" or "chute" may be used to identify system parafoils, parawings, and other devices used to slow the motion of the payload through an atmosphere by creating drag.

Flight Recovery module 203 includes everything needed to get the pilot away from balloon 104 and safely back to the ground. The holding and release rigging preferably resides between the parachute container and the balloon(s). This connects the parachute harness (and the suit and pilot it is strapped to) to the balloon(s) and allows for the separation of the pilot from the balloon(s) at the appropriate time.

Flight Vehicle 205 preferably comprises the apparatus that lifts the payload to the target altitude and carries along with it supporting avionics 105. As such, Flight Vehicle 205 interfaces with many aspects of stratospheric-visit system 100. These interfaces preferably include atmospheric environment (physical/thermal), recovery systems (physical), ground infrastructure & facilities (physical/procedural), ground crew (physical/data/procedural/visual), pilot (procedural/visual). Upon reading the teachings of this specification, those skilled in the art will now appreciate that, under appropriate circumstances, considering such issues as cost, operational parameters, etc., other interfaces, such as, for example, aircraft, air traffic control, the public, etc., may suffice.

Flight Vehicle 205 preferably interfaces the atmospheric environment in flight occurring in the Earth's atmosphere. Flight Vehicle 205 is in physical contact with the air, including buoyancy forces and wind. Flight Vehicle 205 preferably exchanges thermal energy through radiation exchange with the atmospheric environment, preferably through convection with surrounding air.

The ground crew works directly and in physical contact with Flight Vehicle 205 to prepare it for launch, during launch, and during recovery; this preferably includes working with balloon 104, avionics 105, rigging, attachments to pilot and the launch system equipment. Data preferably is sent to the ground crew via avionics 105. Further, mission control preferably can send commands to Flight Vehicle 205 through avionics 105.

For recovery, Flight Vehicle 205 is physically attached to pilot release mechanism 241 (see FIG. 6C), which is in turn attached to the support harness that is strapped to the Pressure Suit—Equipment Module Assembly. This attachment provides the mechanism to release the suited pilot.

Flight Vehicle 205 preferably includes balloon 104 and all of its associated components, including dedicated avionics 105. The other four modules remain on the ground. The balloon equipment module of Flight Vehicle 205 preferably supports flight avionics 105, digital camera capture and transmission hardware, and mechanical and electrical interfaces to the Power, Avionics, Recovery, and Launch Balloon Subsystems.

Ground Support Equipment 212 preferably consists of all modules that remain on the ground during flight operations. Preferred modules of Ground Support Equipment 212 include Mobile Pre-flight Unit 213 including a Ground Cart 214, Mission Control 216, Balloon Launch Equipment 218, and Ground Recovery 220. Mission Control 216 preferably houses all of the equipment needed to track the mission and communicate with the crew and/or pilot. Ground Recovery 212 preferably includes a helicopter to pick up the crew and/or pilot and all equipment needed to recover and refurbish the parachute (parafoil/parawing) and balloon 104. The Balloon Launch Equipment 218 preferably comprises all items needed to unfurl and inflate balloon 104 prior to launch. From an organizational standpoint, the Stratospheric-flight Elements 300 preferably comprise all of the system equipment that must be moved should a launch location change.

From a functional perspective, the Stratospheric-flight Elements 300 also consist of various subsystems. The Environmental Control and Life Support Subsystem (ECLSS) preferably provides thermal control, oxygen, pressurization and other functions to keep the crew and/or pilot alive and comfortable. The Launch Balloon Subsystem provides the preferred means for lifting the crew and/or pilot to a selected altitude. Environmental-containment Module 201 preferably isolates the crew and/or pilot from the outside environment. The Avionics subsystem preferably provides communication and tracking, receives and issues commands, and monitors sensors in other systems.

The Power subsystem preferably provides electrical power to all electrical components. The Recovery subsystem preferably includes the parachute harness, parachute, and reserve parachute, as well as all equipment necessary to recover the pilot, parachute, and balloon after landing. The Ground Elements preferably include all equipment and infrastructure to support the mission. This preferably includes cargo vans, helium trucks, storage facilities, helicopter pads, etc.

Referring now to the relational diagram of FIG. 4B, preferred system functions implemented within Stratospheric-visit System 100 preferably include payload functions 101, launch functions 103, environmental control functions 107, travel control functions 109, communication functions 111, and recovery functions 113, as shown. The above-noted functions of the system preferably interact to enable delivery of payloads to the stratosphere and implement a safe return to Earth.

Payload functions 101 at least preferably provide for the transport of at least one human. Preferred payload functions 101 further comprise actions relating to implementing the transport of system hardware that travels with the crewmember(s), including, for example, parachute apparatus supporting recovery functions 113 (i.e., parafoils/parawings). This arrangement at least embodies herein a payload system structured and arranged to provide at least one payload including at least one human, and at least one parachute system. Upon reading this specification, those with ordinary skill in the art will now appreciate that, under appropriate circumstances, considering such issues as mission objectives, etc., other payload arrangements such as, for example, implementation of unmanned scientific packages, high-altitude communication systems, intelligence-gathering apparatus, etc., may suffice.

Launch functions 103 preferably include implementation of lighter-than-air propulsion functions 115, tethering functions 117, and un-tethering functions 119, as shown. Lighter-than-air propulsion functions 115 are preferably enabled by balloon 104 (see FIG. 2), which preferably functions to "lighter-than-air-propel" the payload from the ground to a target altitude (see also FIG. 4 and FIG. 5). Tethering functions 117 preferably include initial tethering of balloon 104 (at least embodying herein a lighter-than-air propulsion system structured and arranged to lighter-than-air-propel the at least one payload) to the ground, prior to launch (this arrangement at least embodying herein a tethering system structured and arranged to tether, initially to ground, said lighter-than-air propulsion system). Un-tethering functions 119 preferably include the action of un-tethering balloon 104 from the ground to initiate vehicle launch (see also FIG. 2 and FIG. 3) (at least embodying herein an un-tethering system structured and arranged to un-tether, from the ground, said lighter-than-air propulsion system). This arrangement at least embodies herein a launch system structured and arranged to launch the at least one payload.

Environmental control functions 107 preferably control, during the stratospheric visit, at least one human-life-support environment of the flight crew and/or pilot. Travel control functions 109 preferably control, during the stratospheric visit, travel of the payload. Communication functions 111 preferably include system operations associated with flight and ground communication within stratospheric-visit system 100.

Recovery functions 113 preferably enable recovery of the flight crew and/or pilot. Recovery functions preferably comprise balloon-separator functions 121, parachute-related functions 123, and landing functions 125, as shown.

Balloon-separator functions 121 preferably implement separation operations of at least the flight crew and/or pilot from balloon 104, or separation from similar lighter-than-air apparatus functioning to implement such lighter-than-air propulsion functions 115. Parachute-related functions 123 preferably provide air-resistance-assisted deceleration of at least the flight crew and/or pilot after separation of the flight crew and/or pilot from balloon 104. Preferred system embodiments enabling such parachute-related functions 123 preferably include parafoils 108. Alternately preferably, parachute-related functions 123 are implemented by non-standard parawing of semi-rigid design. Furthermore, preferred parachute functions 123, such payload descent stabilization, are preferably implemented by at least one drogue parachute 130 (see FIG. 9 and FIG. 12).

Landing functions 125 preferably implement landing of the flight crew and/or pilot. Upon reading this specification, those with ordinary skill in the art will now appreciate that, under appropriate circumstances, considering such issues as design preference, mission objectives, traveler preferences, marketing preferences, cost, structural requirements, available materials, technological advances, etc., other system functions such as, for example, powered booster-propulsion functions, water-landing functions (i.e., flotation), robotic-payload functions, etc., may suffice.

In addition, stratospheric-visit system 100 comprises operation-specific functions 127 for the implementation of mission-specific functions. Mission-specific subsystems 127 of stratospheric-visit system 100 will be described in the following sections, as examples of preferred implementation of preferred system embodiments.

The following teachings are directed primarily to a single-pilot mission. Although a single-pilot mission is disclosed, it is noted that aspects of the system are applicable to a multi-passenger capsule apparatus and flight operations. In that regard, FIG. 5 shows a schematic diagram, illustrating an alternate preferred flight of a single-pilot flight vehicle 205, according to a preferred embodiment of the present invention.

Figure 5:
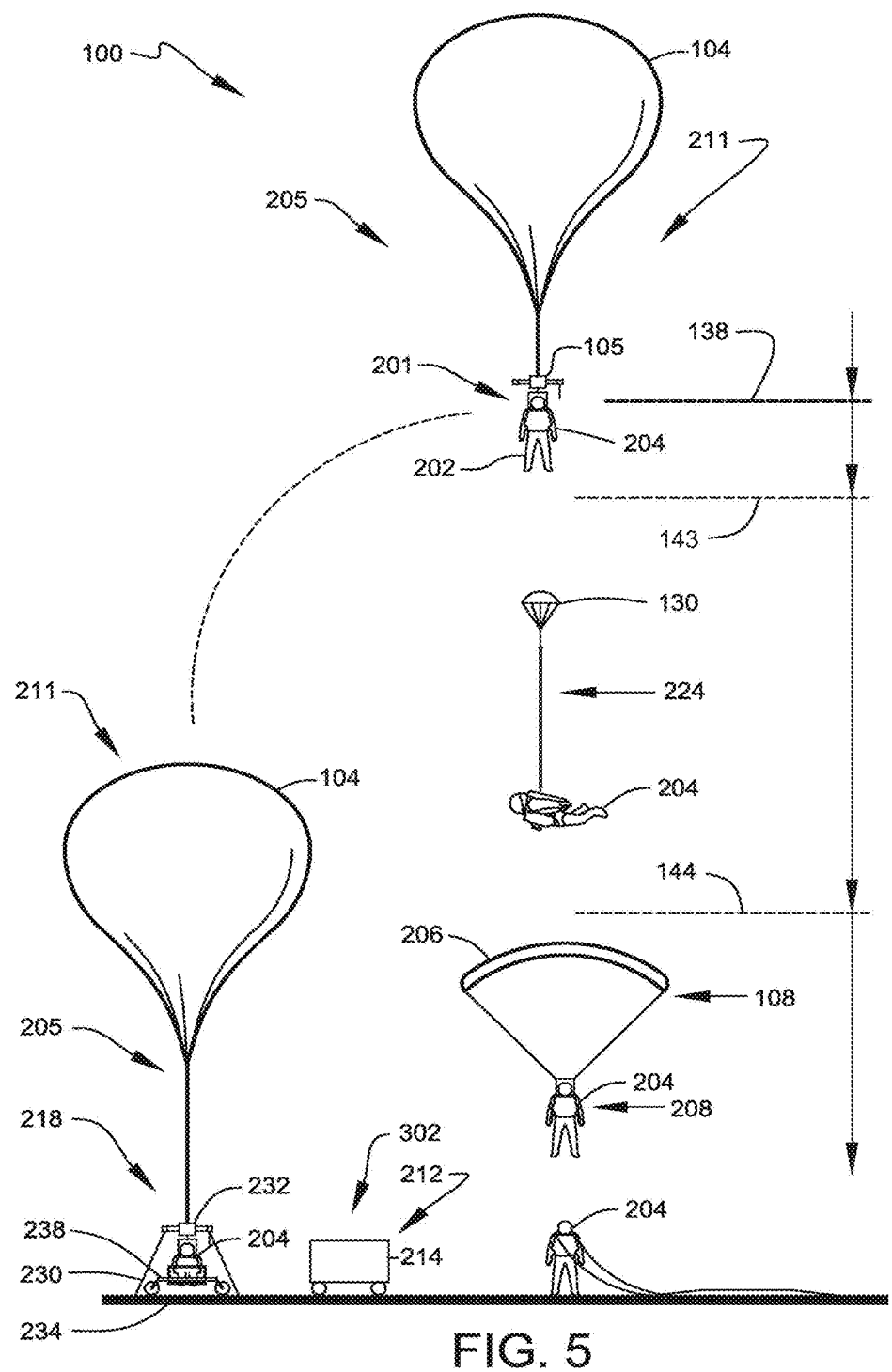
FIG. 5 shows a schematic diagram, illustrating an alternate preferred flight of a single pilot flight vehicle, according to a preferred embodiment of the present invention.

FIG. 5 shows a diagrammatic depiction of a preferred example flight of a single-pilot flight vehicle 205. During such flight, pilot 204 preferably rises to target altitude 138 (generally above at least about 125,000 feet, more preferably at least about 135,000 feet above sea level) and maintains at target altitude 138 for a set duration. Pilot 204 then initiates a separation procedure to separate from balloon 104 allowing pilot 204 to freefall back toward earth (at least embodying herein wherein said payload support system is further structured and arranged to be separated, during launch of the at least one payload, from the at least one payload). A special drogue parachute 130 is preferably deployed at altitude 143 to stabilize and slow the descent velocity of pilot 204. Pilot 204 preferably remains in controlled freefall until the main parachute 206 (preferably a parafoil) is deployed at altitude 144. The pilot will then float down to earth to complete the flight. In one preferred return procedure, drogue parachute 130 is released shortly after release from balloon 104 and remains deployed during essentially the entire return phase. In such preferred return procedure, main parachute 206 is preferably deployed by pilot 204 at about 13,100 feet.

Figure 6A:
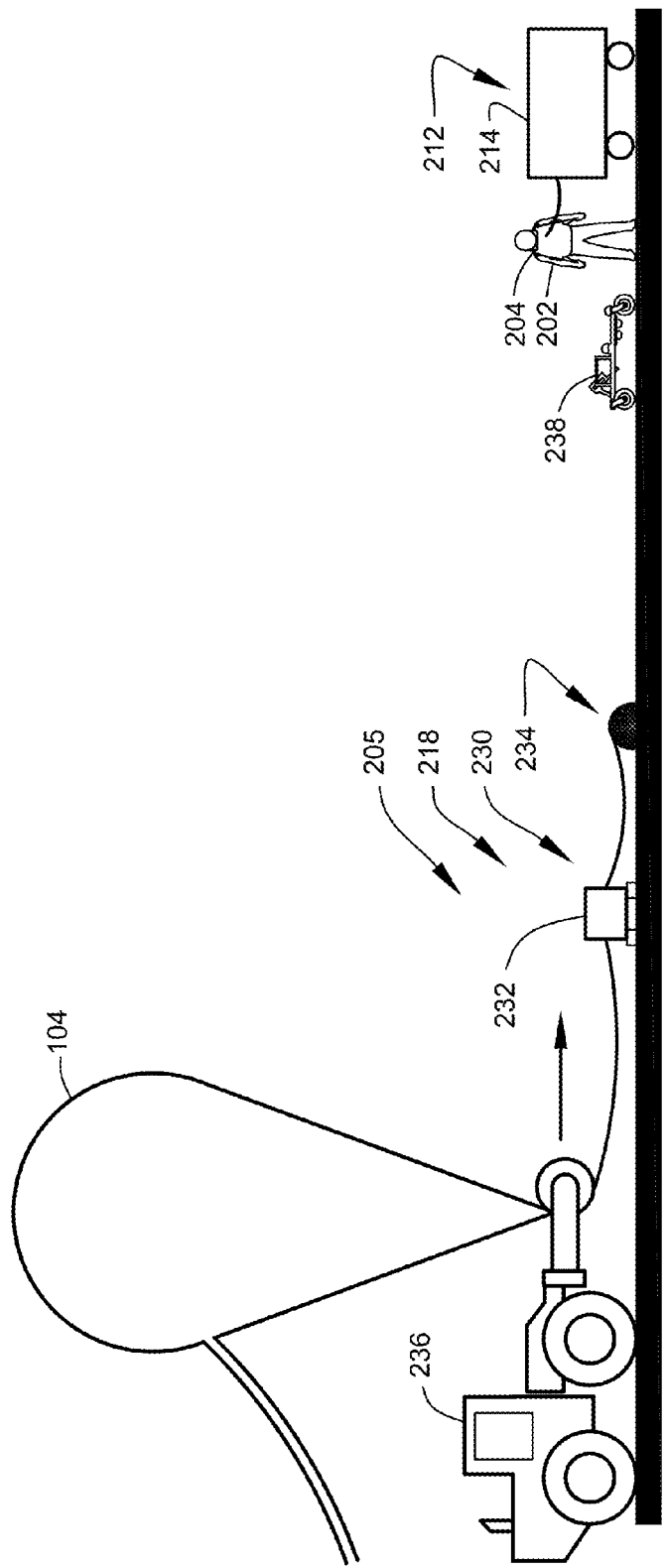
FIG. 6A through FIG. 6C show a series of diagrams, illustrating a preferred launch procedure for the single-pilot flight vehicle, according to preferred apparatus and methods of the present invention.
Figure 6B:
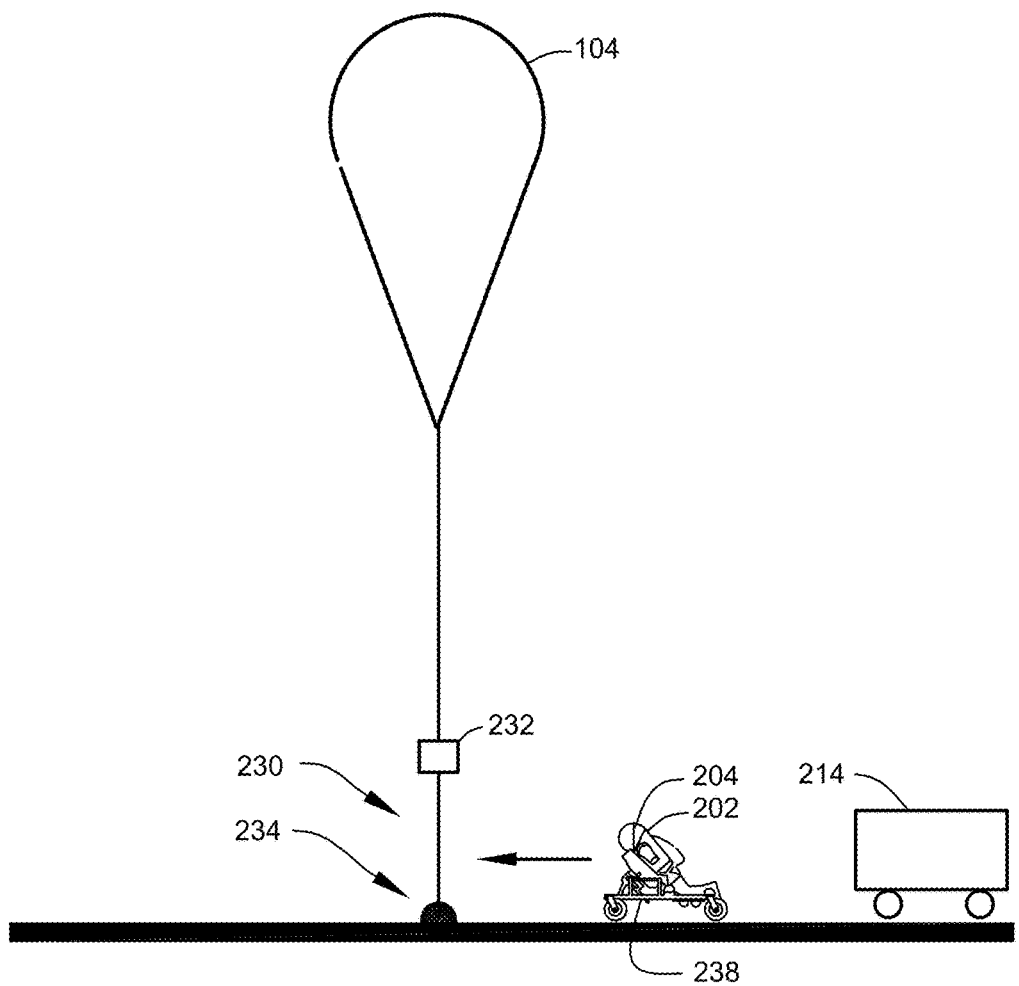
Figure 6C:
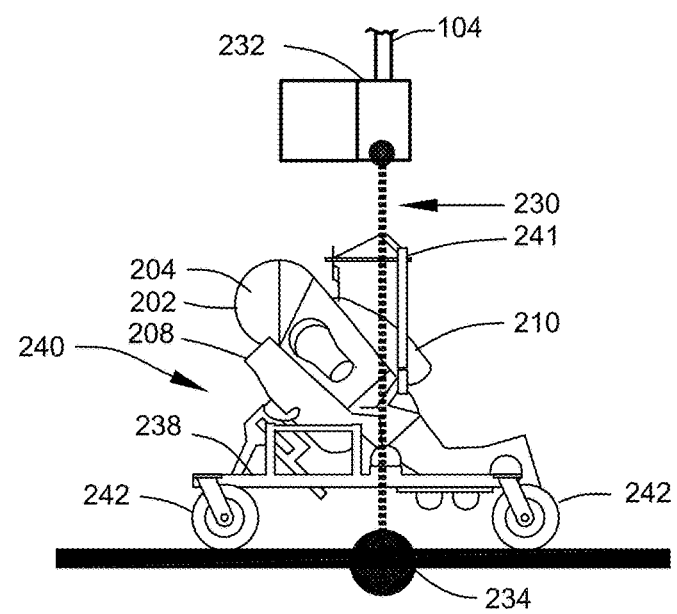

FIG. 6A through FIG. 6C shows a series of diagrams, illustrating a preferred launch procedure for single-pilot flight vehicle 205, according to preferred apparatus and methods of the present invention. Initially, the single-pilot flight vehicle 205 is preferably moored to launch platform 234 prior to launch. In this preferred arrangement, balloon 104 is preferably restrained to launch platform 234 using a tethering system 230 of Balloon Launch Equipment 218, as shown. Tethering system 230 preferably comprises at least one lift-resisting ground restraint structured and arranged to resist upward lift imparted by balloon 104. Tethering system 230 is preferably designed to tether balloon 104 to the ground, preferably using launch platform 234 as the mooring point. Tethering system 230 preferably includes Balloon Equipment Module (BEM 232), which preferably functions to link balloon 104 to launch platform 234, and later to pilot 204 (at least embodying herein at least one balloon-to-restraint coupler structured and arranged to couple said lighter-than-air propulsion system to said at least one lift-resisting ground restraint).

Avionics 105 are preferably housed on the balloon equipment module (BEM 232) at the base of the balloon assembly. The BEM support structure is attached directly to the balloon base fitting and is the physical interface to the payload, the deployable avionics module, ballast, radar reflector, and a radiosonde. Avionics 105 preferably includes: a SkySite computer equipped with two data acquisition boards (DAB), a transponder, two SPOT GPS units, a battery pack, a video camera, transmitter and antennae. SkySite will be programmed to respond to ground signals to activate the ballast release, emergency payload release, and balloon destruct. Balloon destruct is preferably accomplished by dropping the avionics module from the support structure. The avionics module will be tied to a special gore on the balloon, which when dropped will tear out a hole in the gore. SkySite will automatically generate a time-delayed signal to sever the line to the tear-away gore and a second time-delayed signal to release the parachute. Pyrocutters preferably are used to activate mechanical releases. Digital cameras preferably will also be used to capture images/video.

SkySite is a flight tested computer system designed and built by Space Data Corp. that was designed to provide all avionics functions of sounding balloon flights for data collection including lift gas vent and ballast control. This system is preferably being used with some modifications to perform telemetry and control functions for Flight Vehicle 205 and ECLSS (Environmental Control and Life Support System). One SkySite system will be placed on flight vehicle 205, a second will be placed on the equipment module that supports the life support systems. Each SkySite computer is integrated with a GPS receiver and transceiver. Along with GPS data, internal temperature, battery state and other information is relayed to the ground. The GPS data is presented on mapping software to show trajectory information including heading, ascent rate, etc.

SkySite's original configuration is in part designed to control a servomotor for lift gas venting. The servomotor will for Space Dive be used to indirectly control the crown valve. The servomotor will be used to toggle between one of three switches that can be used to either open or close the crown valve.

SkySite's original implementation of ballast dispersal is based on a servomotor-powered auger. It is alternately preferred that this servomotor will be replaced by a simple electronic relay that can power hot-wire cutters for ballast release.

Launch platform 234 preferably comprises a ballast member or ground mounting. The process of filling and standing balloon 104 as described above requires that the base of balloon 104 be tethered to the ground. As previously shown in FIGS. 6A-6C, the base of balloon 104 will be attached to the balloon equipment module (BEM 232) which is designed to be tethered to the ground via attachment points on each end of the BEM I-beam. Tethering directly to the ground was considered to have uncertainty in ground conditions, which would vary from site to site, and uncertainty in wind direction, which would require different ground anchor positions. As such, Launch platform 234 preferably comprises a heavy Launch Plate to serve as the ground anchor. The launch plate preferably will support the lift and drag forces of the balloon under all but the most extreme conditions. To guard against the latter, the launch plate will preferably be in turn tethered to a set of secondary restraints.

The Launch Plate preferably comprises a weld assembly, comprising a 1¼" thick, 8'×12' steel plate. The Launch Plate preferably comprises a weight of approximately 4900 lbs. The launch plate will require several anchor points. The Launch Plate preferably comprises six tie-down rings welded at locations of three along each edge about one foot from the edges and three feet apart. The launch tethers will attach to the steel Launch Plate via a pair of ratchet load binders. The launch plate will be fitted with welded anchor points to which the ratchet load binders will attach.

Anchor points separated by 10 ft (one one each edge of launch plate) appear to provide sufficient space below the balloon-supported BEM 232. The four corner rings will preferably be oriented at an angle of 31 degrees with respect to the preferred 8 foot-edges. The welds of the middle two rings are to run parallel to the 8 ft edges. Aside from handling, the corner rings preferably are used to anchor the plate for additional anchoring reinforcement. The middle two rings are preferably designated for balloon tethering.

Preferably, balloon 104 is filled with lighter-than-air gas enabling the lighter-than-air propulsion functions 115 of the single-pilot flight vehicle 205. When sufficient balloon buoyancy has been achieved, spool vehicle 236 gradually approaches launch platform 234 and releases balloon 104, which preferably lifts BEM 232 into flight position, as shown in FIG. 6B. FIG. 6B, shows the single-pilot flight vehicle 205 in a preferred pre-launch configuration. Preferably, pilot 204 has been preconditioned for flight at Ground Cart 214. Preferably, a payload ground-traversing system 238 is used to transport pilot 204 across the ground to launch platform 234 after decoupling from Ground Cart 214.

Balloon 104 preferably comprises an envelope, preferably comprising polyethylene, preferably balloon grade linear low density polyethylene film, preferably ANTRIX (developed by Tada Institute of Fundamental Research (TIFR)). Preferred specifications for 70,000 foot, 90,000 foot, and 120,000 foot balloons are shown in Table 1, Table 2, and Table 3, respectively.

TABLE 1

1) BALLOON INFORMATION

A) MANUFACTURER: TIFR BALLOON FACILITY
B) MODEL NO.: T8K
C) SERIAL NO.: 2-5/00
D) INCL. DATE OF MFR: JUNE 2000
2) FILM INFORMATION

A) MANUFACTURER: WINZEN INTL
B) NAME: SF372
C) INCL DATE OF MFR: APRIL/MAY 1993
3) BALLOON DESIGN

A) TYPE NATURAL SHAPE, TAPED, CAPPED
B) VOLUME, Cu.M., 7883
C) SIGMA: 0.08
D) BALLOON WT: 232.0 Kg
E) GORE WIDTHS:
TOP: 8.0 Cm
MAX: 104 Cm
BASE 12.0 Cm
F) INFLATED DIMENSIONS:
HEIGHT: 24.9 M
DIAMETER: 26.3 M.
NO. OF GORES: 81
G) NOMINAL LOAD: 2600 Kg.
H) NOM. ALTITUDE, 10400 M
I) RECOMMENDED SUSPENDED WEIGHTS, KG.
Rec. Minimum: 2681 Kg.
Maximum: 1551 Kg

|  | SHELL | CAP1 | CAP2 | CAP3 |
|---|---|---|---|---|
| J) FILM GUAGE, MICRONS | 20.3 | 20.3 | 20.3 | 20.3 |
| K) SURFACE AREA, SQ. M. | 1969 | 1969 | 1969 | 1969 |
| L) LENGTH, M. | 39.5 | 39.5 | 39.5 | 39.5 |
| CAP 3 LOCATION: NA | N: BALLOON WT., Kg.: 232 | — | O) BUBBLE MARKS: NIL | P) NOM. LAUNCH MARK 18.0 M |

4) LOAD TAPES:

A) TYPE: Laminated Polyester
B) LOAD RATING: 227 Kgf B. 3
Total No. 81
5) REEFING SLEEVE A) FILM GAUGE:
TEAR PANEL: N/A
SLEEVE: NA
B) GORE SEAM NO.: N/A
DISTANCE FROM APEX: N/A
6) INFLATION TUBES:

A) QUANTITY: 2 Nos.
B) DIST. FROM APEX, M: 18.0
C) ON GORES: 2 & 42
D) LENGTH, 40.0 M
E) GAUGE: 76 Milo.
F) DIAMEER: 24.2 Cm.
7) VENTING DUCTS:

A) QUANTITY: 3 Nos.
B) DIST. FROM BASE, M: 14
C) TYPE: WINDOW TYPE SIDE ESCAPE DUCT, TAGED
D) LENGTH, M: 13.5
E) GUAGE: 60 Microns
F) AREA EACH: 2.9 Sq. M.

TABLE 1-continued

G) TOTAL AREA: 8.7 Sq. M.
H) LOCATED ON GORE SEAMS.: 12, 13; 39, 40; & 66, 67
8) DESTRUCT DEVICE:

A) RIP LINE RATING: 320 Kg.
TYPE: BRAIDED NYLON
B) BREAK LINE RATING: 8.0 Kg.
C) DISTANCE FROM APEX: 4.48 M.
D) GORE NO.: 6
E) CUTTER: N/A
9) VALVE CABLE:

A) WIRES: 6 Nos.
GAUGE: 19
DOUBLE BRAIDED
B) SHEATH GAUGE: 50 Microns
C) LOCATED ON SEAM NO.: 6
10) TOP FITTING:

A) TYPE: PLATE, HOOP & SECMENTED CLAMP RING
B) NO. OF PORTS: ONE
C) DIAMETER: 68.5 Cm
D) WEIGHT: 7.86 Kg.
11) BOTTOM FITTING:

A) TYPE: COLLAR & WEDGES
B) LOAD ATTACHMENT: 3/4" STUD WITH 16 TPI UNF,
Available stuf length for payload hooking: 30 mm
C) DIAMETER: 15.2 Cm.
D) WEIGHT: 3.0 Kg.
12) PACKAGING INFORMATION I) WRAPPER: Pink Polethylene, 75 Microns
B) WEIGHT: 6.16 Kg.
II) BOX: Weight: 133.8 Kg.
A) DIMENSIONS: Cm. 123 × 123 × 130
B) VOLUME: 1968 Cu.M
C) GROSS WEIGHT: 378.1 Kg.
13) OTHER PINK POLY STREAMER ATTACHED ON SEALS NO.: 2, 3, AND 42, 43
FROM INFLATION TUBES ATTACHMENT POINT TO BASE

TABLE 2

T.I.F.R BALLOON FACILITY
HYDERABAD-500 062
BALLOON SPECIFICATIONS FOR PARAGON SPACE
DEVELOPMENT CORPORATION, USA

1) BALLOON INFORMATION

A) MANUFACTURER: TIFR BALLOON FACILITY
B) MODEL NO: T22K
C) SERIAL NO.: 4-8/12
D) INCL. DATE OF MFR: September 2012
2) FILM INFORMATION:

A) MANUFACTURER: TIFR BALLOON FACILITY
B) NAME: ANTRIX
C) INCL DATE OF MFR: February 2012
3) BALLOON DESIGN A) TYPE NATURAL SHAPE, TAPED
B) VOLUME, Cu.M., 21,740
D) SIGMA: 0.20
D) BALLOON WT: 128 Kg.
E) GORE WIDTHS:
TOP: 6.0 Cm
MAX: 240 Cm
BASE: 28.0 Cm
F) INFLATED DIMENSIONS:
HEIGHT: 32.4 M
DIAMETER: 37.4 M.
NO. OF GORES: 49
G) NOMINLA LOAD: 276 Kg.
H) NOM. ALTITUDE, 28800 w/ H2, 28000(w/He)

TABLE 2-continued

T.I.F.R BALLOON FACILITY
HYDERABAD-500 062
BALLOON SPECIFICATIONS FOR PARAGON SPACE
DEVELOPMENT CORPORATION, USA

I) RECOMMENDED SUSPENDED WEIGHTS, KG.
Rec. Minimum: 191 Kg.
Maximum: 400 Kg.

|  | SHELL | CAP1 | CAP2 | CAP3 |
|---|---|---|---|---|
| J) FILM GUAGE, MICRONS | 20 | — | — | — |
| K) SURFACE AREA, SQ. M. | 3,832 | — | — | — |
| L) LENGTH, M. | 54.1 | — | — | — |
| CAP 3 LOCATION: NA | N: BALLOON WT., Kg.: 128 | — | O) BUBBLE MARKS: Every 1 m From filling tube to 24 m | P) NOM. LAUNCH MARK: 16.2 M |

4) LOAD TAPES:

A) TYPE: Laminated Polyester
B) LOAD RATING: 91 Kgf B. 3
Total No. 49
5) REEFING SLEEVE A) FILM GAUGE:
TEAR PANEL: 6.0 Microns
SLEEVE MICRONS: 50.0

TABLE 2-continued

T.I.F.R BALLOON FACILITY
HYDERABAD-500 062
BALLOON SPECIFICATIONS FOR PARAGON SPACE DEVELOPMENT CORPORATION, USA

B) GORE SEAM NO.: 1
DISTANCE FROM APEX: 18.0 M
6) INFLATION TUBES:

A) QUANTITY: 2 Nos.
B) DIST. FROM APEX, M: 7.0
C) ON GORES: 2 & 28
D) LENGTH, 35.0 M
E) GAUGE: 7.5 Milo.
F) DIAMETER: 24.2 Cm.
7) VENTING DUCTS:

A) QUANTITY: 2 Nos.
B) DIST. FROM BASE, M: 18
C) TYPE: WINDOW SET
D) LENGTH, M: 19.5
E) GUAGE: 20 Microns
F) AREA EACH: 2.19 Sq. M.
G) TOTAL AREA: 4.38 Sq. M.
H) LOCATED ON GORE SEAMS.: 12, 13 & 36, 37
8) DESTRUCT DEVICE:

A) RIP LINE RATING: 320 Kg.
TYPE: BRAIDED NYLON
B) BREAK LINE RATING: 10.0 Kg.
C) DISTANCE FROM APEX: 3.0 M.
D) GORE NO.: 6
E) CUTTER: N/A
9) VALVE CABLE:

A) WIRES: 4 Nos. OF 67 M LENGTH
LABELE D
A,B,C,D
RESISTENCE: AB: 1.8Ω; CD 2.0Ω
DOUBLE BRAIDED
B) SHEATH GAUGE: 28/0.26 MM, ANNELED TINNED COPPER
C) LOCATED ON SEAM NO: REEFING SLEEVE SEAM
10) TOP FITTING:

A) TYPE: PLATE, HOOP & SECMEN TED CLAMP RING
B) NO. OF PORTS: ONE
C) DIAMETER: 68.0 Cm
D) WEIGHT: 8.7 Kg.
11) BOTTOM FITTING:

A) TYPE: COLLAR & WEDGES
B) LOAD ATTACHMENT: 1/2" STUD WITH 13 TPI UNC, Available stud length for payload hooking: 38 mm
C) DIAMETER: 13.8 Cm.
D) WEIGHT: 1.9 Kg.
12) PACKAGING INFORMATION I) WRAPPER: Pink Polyethylene, 75 Microns
38 Micron Light Yellow Color wrapper from Apex to 19 M end distinctly marked, 1.32 KG.
B) WEIGHT: 7.6 Kg.
II) BOX Weight: 132 Kg.
A) DIMENSIONS: Cm. 152.2 × 91 × 101
B) VOLUME: 1398 Cu.M
C) GROSS WEIGHT: 259.7 Kg
13) OTHER

* No radar Reflecting Yarn in Load Tape.
* Marks on Wrapper: 8 M, 9 M,10 M . . . 24 M
* After inflation and before launch, initiate tear about 2 M in the tear pane indicated by Red arrow strip.
* Inflation tubes fan folded and kept at attachment points (7.0M from top Apex)for deployment.

TABLE 3

T.I.F.R BALLOON FACILITY
HYDERABAD-500 062
BALLOON SPECIFICATIONS FOR PARAGON SPACE DEVELOPMENT CORPORATION, USA

1) BALLOON INFORMATION

A) MANUFACTURER: TIFR BALLOON FACILITY
B) MODEL NO.: T120K
C) SERIAL NO.: 1-1/11
D) INCL. DATE OF MFR: FEBRUARY & MARCH 2011
2) FILM INFORMATION

A) MANUFACTURER: TIFR BALLOON FACILITY
B) NAME: ANTRIX
C) INCL DATE OF MFR: JANUARY 2010
3) BALLOON DESIGN

A) TYPE NATURAL SHAPE, TAPED
B) VOLUME, Cu.M, 116,838
D) SIGMA: 0.36
D) BALLOON WT.: 378.8 Kg
E) GORE WIDTHS:
TOP: 8.0 Cm
MAX: 250.0 Cm
BASE: 24.6 Cm
F) INFLATED DIMENSIONS:
HEIGHT: 52.5 M
DIAMETER: 66.8 M.
NO. OF GORES: 84
G) NOMINAL LOAD: 275 Kg.
H) NOM. ALTITUDE, 10400 M
I) RECOMMENDED SUSPENDED WEIGHTS, KG.
Rec. Minimum: 2581 Kg.
Maximum: 1551 Kg

|  | SHELL | CAP1 | CAP2 | CAP3 |
|---|---|---|---|---|
| J) FILM GUAGE, MICRONS | 26 | N/A | N/A | N/A |
| K) SURFACE AREA, SQ. M. | 11789 | N/A | N/A | N/A |
| L) LENGTH, M. | 83.3 | N/A | N/A | N/A |
| CAP 3 LOCATION NA | N: BALLOON WT., Kg.: 378.8 | — | O) BUBBLE MARKS EVERY 1 M FROM FILLING TUBE | P) NOM. LAUNCH MARK: 18.0 M |

4) LOAD TAPES:

A) TYPE: Laminated Polyester
B) LOAD RATING: 91 Kgf B. 3
Total No. 84
5) REEFING SLEEVE A) FILM GAUGE:
TEAR PANEL: 6 MICRON
SLEEVE: 50 MICRONS
B) GORE SEAM NO.: 1
DISTANCE FROM APEX: 23 M
6) INFLATION TUBES:

A) QTY: 2 Nos.
B) DIST. FROM APEX, M: 11.0
C) ON GORES: 2 & 44
D) LENGTH, 32.0 M
E) GAUGE: 76 Milo.
F) DIAMETER 24.2 Cm.
7) VENTING DUCTS:

A) QUANTITY: 2 Nos.
B) DIST. FROM BASE, M: 31
C) TYPE: WINDOW TYPE, TAGED
D) LENGTH, M: 32.5
E) GUAGE: 26 Microns
F) AREA EACH: 4.3 Sq. M.
G) TOTAL AREA: 8.6 Sq. M.
H) LOCATED ON GORE SEAMS.: 23,24 & 85,86

TABLE 3-continued

T.I.F.R BALLOON FACILITY
HYDERABAD-500 062
BALLOON SPECIFICATIONS FOR PARAGON SPACE
DEVELOPMENT CORPORATION, USA

8) DESTRUCT DEVICE:

A) RIP LINE RATING: 320 Kg.
TYPE: BRAIDED NYLON
B) BREAK LINE RATING: 8.0 Kg.
C) DISTANCE FROM APEX: 4.0 M.
D) GORE NO.: 6
E) CUTTER: N/A
9) VALVE CABLE:

A) WIRES: 4 Nos. of 115 M
LENGTH LABELED A,B,C,D
RESISTANCE: AP: 3.8Ω; CD: 4.0Ω
DOUBLE BRAIDED
B) SHEATH GAUGE: 28/0.26 MM, ANNELED TINNED COPPER
C) LOCATED ON SEAM NO.: 1
10) TOP FITTING:

A) TYPE: PLATE, HOOP & SECMENTED
CLAMP RING
B) NO. OF PORTS: ONE
C) DIAMETER: 68.5 Cm.
D) WEIGHT: 7.85 Kg.
11) BOTTOM FITTING:

A) TYPE: COLLAR & WEDGES
B) LOAD ATTACHMENT: 1/2" STUD WITH 13 TPI UNC,
Available stud length for payload hooking: 27 mm
C) DIAMETER: 13.6 Cm.
D) WEIGHT: 1.9 Kg.
12) PACKAGING INFORMATION I) WRAPPER: Pink Polyethylene, 75 Microns
38 Micron Light Yellow Color wrapper from Apex to 26 M end
distinctly marked, 1.83 KG.
B) WEIGHT: 15.8 Kg.
II) BOX: Weight: 133.8 Kg.
A) DIMENSIONS: Cm. 147.2 × 122 × 112
B) VOLUME: 2.01 Cu.M
C) GROSS WEIGHT: 554.5 Kg
13) OTHER

* No Radar Reflecting yarn in Load Tape.
* Marks on wrapper:
* After inflation and before launch, initiate tear about 2 M in the tear panel indicated by Red arrow strip.
* Inflation tubes fan folded and kept at attachment point (11.0 M from top Apex) for deployment.
* SET ducts ends at 0.5 m from bottom apex.
* Balloon top reinforced with 3" Fixon tape up to 55 cms.
* Apex valve cable clamped at top and bottom fittings.

Referring to FIG. 6C, with the balloon 104 standing, pilot 204 is preferably wheeled to a position directly underneath BEM 232 and attached to the BEM 232 using pilot release mechanism 241, as shown (at least embodying herein at least one payload coupler structured and arranged to couple the at least one payload to such at least one balloon-to-restraint coupler). In addition to this physical connection, one or more electrical connection(s) are preferably made between the avionics module (AM) and the primary (remote) payload release pyrocutter.

Preferably, un-tethering functions 119 of launch system are implemented by releasing each tether securing BEM 232 to the ground, thus allowing single-pilot flight vehicle 205 to lift pilot 204 out of payload ground-traversing system 238 and upward toward target altitude 138. Each tether will be secured to BEM 232 with an interfacing 3-ring release mechanism. The trigger line for each 3-ring release mechanism will be coupled together such that a single action (pull) will simultaneously disengage both 3-ring release mechanisms. This concept has been successfully tested by applicant. (at least embodying herein wherein said un-tethering system comprises at least one restraint-decoupling system structured and arranged to decouple said at least one balloon-to-restraint coupler from said at least one lift-resisting ground restraint, wherein the at least one payload, after decoupling said at least one balloon-to-restraint coupler from said at least one lift-resisting ground restraint, remains coupled to said lighter-than-air propulsion system by said at least one balloon-to-restraint coupler).

Upon release, under ideal conditions, balloon 104 pulls pilot 204 out of the launch sedan and both rise straight up. With a side wind, balloon 104 and payload will, after launch, have a tendency to rotate about the system's center of gravity until the crown of the balloon and the payload form a vector approximately parallel with that formed by gravity and drag. Payload ground-traversing system 238 is preferably designed to accommodate such translational and rotational motions.

Figure 8:
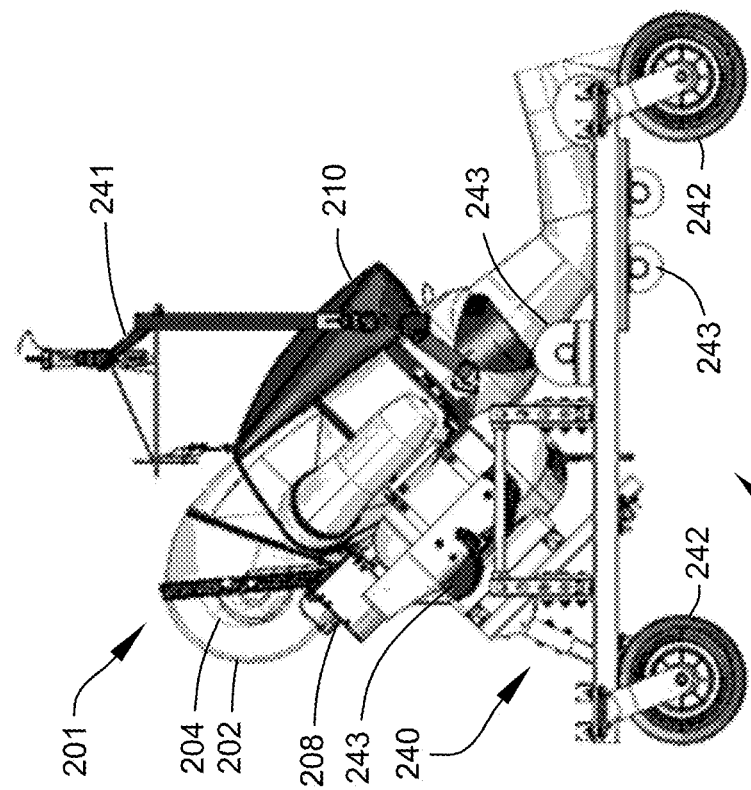
FIG. 8 shows side view of the pilot positioned within the payload ground-traversing system of FIG. 7.
Figure 7:
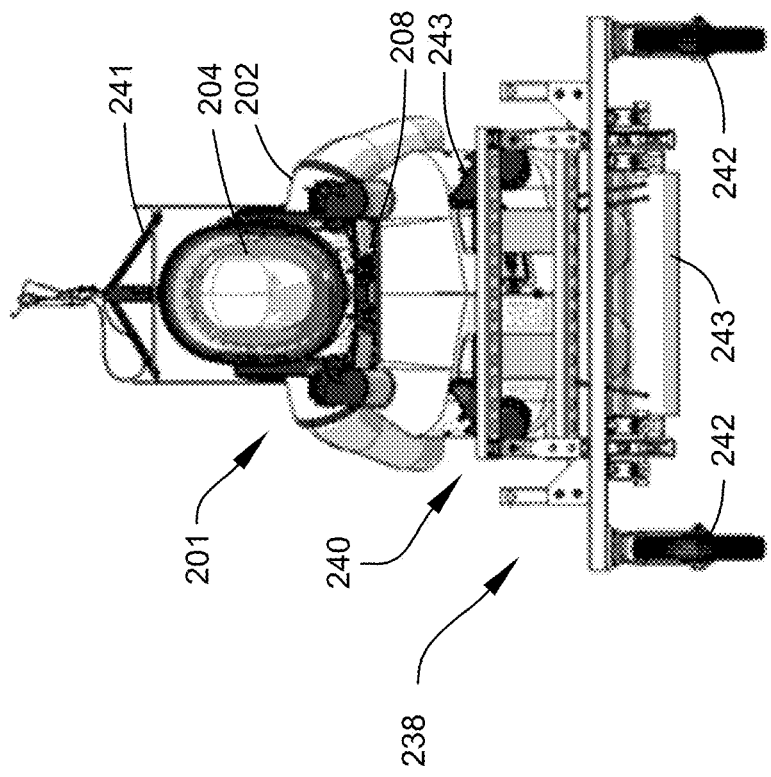
FIG. 7 shows a front view of a pilot positioned within a payload ground-traversing system, according to a preferred embodiment of the present invention.

FIG. 7 shows a front view of pilot 204 positioned within payload ground-traversing system 238, according to a preferred embodiment of the present invention. FIG. 8 shows side view of pilot 204 positioned within payload ground-traversing system 238. Payload ground-traversing system 238 preferably comprises payload support system 240 configured to support, during launch, the human pilot 204. Preferably, payload support system 240 comprises an injury-minimizing system 243 structured and arranged to minimize injury, during launch, to pilot 204 and their accompanying environmental control system equipment. Preferably, such injury-minimizing system 243 comprises at least one configuration that shape-conforms to pilot 204 and the accompanying ECLSS/Avionics hardware. Preferably, such injury-minimizing system 243 comprises at least one cushioning configured to cushion at least the pilot 204 and the accompanying ECLSS/Avionics hardware.

Preferably, payload support system 240 comprises a motion direction system structured and arranged permit pilot 204 to move in both rotational and translational directions. Such preferred motion direction system is enabled by wheels 242. All wheels are preferably of swivel design to maximize the ground maneuverability of pilot 204 during liftoff. Upon reading this specification, those with ordinary skill in the art will now appreciate that, under appropriate circumstances, considering such issues as design preference, user preferences, marketing preferences, cost, structural requirements, available materials, technological advances, etc., other low-friction arrangements such as, for example, skids, low-friction plates, rollers, etc., may suffice.

The preferred single-pilot system architecture has pilot 204 "directly" attached to the balloon; that is, unlike the preferred embodiment of FIG. 1, pilot 204 is preferably protected inside of pressure suit 202 and will carry all needed equipment in an Equipment Module 208 that is preferably located adjacent the chest of pilot 204. Equipment Module 208 preferably contains oxygen, communication equipment, electrical power and a heater and pump that will circulate warm water around the body of pilot 204.

In the presently-disclosed single-pilot mode, the Stratospheric-flight Elements preferably comprise the collection of all modules that leave the ground: the Environmental-containment Module 201 (in this case pressure suit 202), Equipment Module 208, Flight Recovery Module 203, and Flight Vehicle 205.

Flight Vehicle 205 preferably comprises balloon 104 and all other components that adapt balloon 104 to manned flight. This preferably includes rigging and valving as well as avionics that announce the location of the balloon per Federal Aviation Administration (FAA) regulations. Flight Vehicle avionics 105 are preferably housed on the balloon equipment module (BEM 232) at the base of the balloon assembly. FIG. 6C shows BEM 232 secured to the base fitting of balloon 104.

Environmental-containment Module 201 preferably consists of pressure suit 202 (at least embodying herein an environmental control system structured and arranged to control, during the stratospheric visit, at least one human-life-support environment of the at least one human), but also includes all ECLSS (Environmental Control and Life Support System) and avionics equipment inside of the suit. Preferred ECLSS components include a neck dam, regulators, relief valves and water supply, etc. Preferred avionics equipment include the microphone and headset that allow pilot 204 to communicate with the ground.

Equipment Module 208 consists of a frame that preferably serves as a mounting location for components of various subsystems. Preferred example subsystems include the ECLSS oxygen tanks and components of the thermal fluid loop such as the pump, cold plate, heater and oxygen heat exchanger. The avionics boxes preferably mount to the frame or the ECLSS cold plate. The batteries are also preferably attached to the frame.

The Flight Recovery Module 203 preferably consists of the parachute harness, parachute components and the separation mechanism. The harness is preferably placed on pressure suit 202. In one preferred embodiment of the present system, Equipment Module 208 is attached to the front of the harness similar to a tandem skydiver. In this arrangement, the harness is preferably similar to a tandem sky-dive harness. The harness is also the component that preferably functions to directly connected pilot 204 to Flight Vehicle 205. Alternately preferably, Equipment Module 208 is rigidly mounted to pressure suit 202.

Ground Support Equipment 212 preferably consists of all modules that remain on the ground during flight operations. Preferred modules of Ground Support Equipment 212 include Ground Cart 214, Mission Control 216, Balloon Launch Equipment 218, and Ground Recovery 220.

Preferably, Ground Cart 214 provides oxygen, cooling, electrical power and communications for pilot 204 while the pre-breathe process is taking place. The Pilot is preferably disconnected from Ground Cart 214 approximately 15 minutes before launch.

Preferably, Mission Control 216 is where all data from the Flight System will be received, processed and interpreted. Preferably, multiple people monitor computers to evaluate the data from Flight System 222. This is also where direct verbal communication with the pilot will preferably take place. Balloon Launch Equipment 218 preferably comprises apparatus needed to unfurl balloon 104, inflate it, keep it moored to the ground, and initiate release.

Ground Recovery 220 preferably includes all items needed to find the pilot 204 after landing, take pilot 204 to a medical center and to recover and refurbish all parachute and balloon components. Equipment module 208 preferably includes the physical container that resides on the chest of pilot 204, the structure that attaches that container to pilot 204 and any tubes or wires extending to interfaces on other systems. Equipment Module 208 preferably serves as the structural support for many of the components of the various subsystems of Flight System 211. These subsystems preferably include Avionics, Power and ECLSS. The equipment is rather heavy, requiring significant structure. Preferred equipment is bulky and irregularly shaped; therefore, a neoprene cover 304 is preferably placed over the equipment held by Equipment Module 208 to improve the aerodynamic characteristics of the assembly. Additional "spacers" are preferably provided, as required, to further smooth the shape underneath the cover to prevent aerodynamic moment forces.

In one preferred embodiment of the present system, Equipment Module 208 is preferably attached to the Recovery System harness via multiple hooks and straps. The intention is for the Equipment Module to be supported by the harness during ascent and loiter rather than being suspended from the pilot (in other words, the pilot is not part of the load path).

A primary component of Equipment Module 208 is the frame. The frame is preferably constructed from 8020 extrusions which are cut to length and connected with standard fittings. Hooks are preferably attached to provide a mounting location to the harness of the Flight Recovery System 203. There are three sections of the frame with pivots that allow the shape to be adjusted to fit pilot 204.

The frame is alternately preferably a hard-mounted design using structural pick-up points on the torso region of pressure suit 202, as shown (at least embodying herein wherein such at least one equipment module comprises a torso-coupling system structured and arranged to couple said at least one equipment module to a torso of the at least one human). It is preferred that frame (at least embodying herein a torso-coupling system) fit closely about a front of the torso of pilot 204. Because pressure suit 202 is composed of soft goods, the manufacturing process does not produce a known location of structural pick-up points, with relation to individual suit components when the suit is inflated. This drove the need for about a 1-inch degree of adjustability in the up-down and forward-back translation modes. An adaptor plate was preferably implemented to allow for such large size adjustments in the main frame system (at least embodying herein wherein such rigid adapter comprises at least one size adjuster structured and arranged to adjust dimensions of such rigid adapter to the front of the torso of the at least one human prior to launch). The adaptor plate also allows for adjustment in the roll and pitch translation modes (with the pilot's chest being "forward").

There are three systems that are contained partially or in total within the Pressure Suit Module, which preferably include pressure suit 202, the ECLSS, and the avionics subsystem. The ECLSS of the pressure suit module preferably implements environmental control functions 107 to maintain the health of pilot 204 by supplying heating and cooling, providing oxygen and removing carbon dioxide, and maintaining a pressurized environment. An avionics system preferably monitors sensors and preferably provides uplink and downlink communications. Equipment Module 208 preferably houses a majority of the ELCSS components & oxygen storage, avionics, and batteries for the mission.

The ECLSS is preferably built on the heritage of the 51034 Pilot's Protective Assembly (PPA) and NASA's 51035 Advanced Crew Escape Suit (ACES). These ECLSS oxygen flow and pressure systems have similar features and in most cases similar components that are used in these heritage systems. The S1034 PPA oxygen system is described in DN OOPSTP PPA O2 System. The NASA ACES is described in some detail in USA009026, Crew Escape System 21002.

The ECLSS oxygen flow system preferably uses some of the same components (demand regulator and exhalation valves) as the S1034 PPA and S1035 ACES except that the ACES use a single demand regulator rather than a dual regulator. The ECLSS of stratospheric-visit system 100 is more like the ACES system in that it preferably incorporates a neck dam and a larger helmet volume rather than the face seal and smaller oral/nasal cavity of the 51034 PPA. Unlike ACES or PPA, the ECLSS of stratospheric-visit system 100 also includes a respiration mask to minimize the risk of fogging and encourage CO2 washout. To maintain pressure, the ECLSS pressure system preferably uses the same dual suit controller as used in both the PPA and ACES systems, and a pressure relief valve similar to the ACES system.

Ground Cart preferably provides oxygen, cooling, electrical power and communications while pilot 204 undergoes a preferred pre-breathe process to reduce nitrogen loading in body. The Ground Cart provides oxygen, cooling, electrical power and communications for the pilot while the pre-breathe process is taking place. The pilot is disconnected from the ground cart approximately 15 minutes before launch.

Prior to launch, pilot 204 must carry out a pre-breathe process. Because the absolute pressure inside of pressure suit 202 will be around 3.5 psi when at maximum mission altitude, any nitrogen in the pilot's blood stream will come out of solution and create gas bubbles. These bubbles can cause pain and even death. To prevent this, the pilot must breathe pure oxygen until the nitrogen is purged from his body. This means pilot 204 must don the pressure suit module to isolate himself from the ambient ground atmosphere. As a result, pilot 204 requires a supply of oxygen and requires heating and/or cooling via the liquid thermal garment and will need to communicate with the ground crew.

The preferred pre-breathe process lasts up to three hours and consumes a large amount of oxygen as well as electrical power. Cooling may be needed, but the preferred Flight System ECLSS is designed only to provide heating. Therefore, Ground Cart 214 is preferably designed to provide oxygen, cooling, power and communications without using the consumables intended for flight and adding complexity to Flight System 211.

The preferred ECLSS is designed to allow connections into the oxygen lines. The oxygen is preferably supplied at 80 psi so that the 65 psi regulators of Flight System 211 do not open and expel oxygen from the flight tanks. Preferably, quick disconnect connections are provided in the water loop such that Ground Cart 214 can preferably provide water for cooling and/or warming. Electrical power is preferably supplied to run the avionics so that communication can take place and all systems can be checked on the ground prior to flight, again preserving the battery power of Flight System 211. Mission Control preferably encompasses the hardware, software, and personnel involved in directing the execution of all flight procedures from flight planning through recovery. Preferred Mission Control personnel include a flight director, mission meteorologist, medical specialist, ECLSS specialist, recovery system specialist, avionics specialist and flight vehicle specialist. The flight director is preferably responsible for communication with ATC, launch director and with mobile (recovery) operations. Preferred procedures to be executed include, but are not limited to, weather forecasting, medical oversight, flight, ECLSS, recovery and launch hardware check and preparation, launch operations, system monitoring, and ground and air-based flight recovery.

FIG. 9 shows a preferred drogue parachute 130 of the single-pilot embodiments of stratospheric-visit system 100. FIG. 10 shows a diagrammatic rear view of a preferred stowed embodiment of drogue parachute 130 of FIG. 9. FIG. 11 shows a diagrammatic rear view of another preferred stowed embodiment of drogue parachute 130 of FIG. 9.

Flight Recovery Module 203 preferably includes deceleration components, preferably including drogue parachute 130 that preferably functions to stabilize pilot 204 during descent and pulls main parachute 206 from parachute container 210 (see FIG. 9, FIG. 10, and FIG. 11). Should there be a problem with main parachute 206, a reserve parachute is automatically deployed.

Further, ground control preferably can activate any of the parachute systems should the pilot be unable. The parachute activation system preferably comprises a line restraining a spring that upon release pulls the parachute release cord. The system is preferably activated (by ground command) by a hotwire cutting the spring retaining line. The pull cords and restraint cords are all held by passing through holes in the top plate and then tying a knot to keep the cords from passing back through. The restrained spring load is ~13 lbf and the actuation stroke is ~3.0 inches, and it weighs about 0.3 lbs.

Referring to FIG. 9 through FIG. 11, drogue parachute 130 is preferably deployed to both stabilize and slow the descent velocity of pilot 204. Main parachute 206 is preferably deployed using the drogue to pull main parachute 206 from the rear-mounted parachute container 210. After release from balloon 104, pilot 204 preferably remains in a controlled freefall using drogue parachute 130 to both stabilize the pilot and limit the descent velocity. In developing drogue parachute 130, Applicant considered the dynamics of the freefall at the transonic velocities experienced by pilot 204 during the descent. Applicant determined that implementation of a stabilization parachute is preferred during the descent; however, the preferred point of deployment was selected only after significant research and experimental testing. Several critical issues relating to drogue deployment were identified by Applicant; these include, how to mitigate the potential for the drogue wrapping around the pilot due to the low dynamic pressure environment occurring in the period immediately following the high-altitude balloon release (i.e., anywhere above about 60,000 feet), how to reliably deploy drogue parachute 130 beyond the payload's wake (burble) at transonic velocities, and how the subsequent high-pressure period of the descent potentially impacts mechanical parachutes. The result was the development of an unusual drogue configuration.

Drogue parachute 130 of parachute system 123 preferably comprises means for coupling drogue parachute 130 with the payload (in this case, pilot 204). In the present preferred embodiment such coupling is performed by parachute bridle line 226. A key feature of parachute bridle line 226 is the preferred incorporation of at least one drogue stiffener 224 used to stiffen portions of parachute bridle line 226. Drogue stiffener 224 preferably functions to provide a means for distance-separating drogue parachute 130 from pilot 204 (at least embodying herein wherein such coupling means comprises distance separating means for distance-separating of parachute system from the payload) and further provides a means for controlling compressive resistance of the stiffened parachute bridle line 226 to assist implementation of physical-distance separation of drogue parachute 130 from pilot 204 (at least embodying herein compressive-resistance control means for controlling compressive resistance of distance separating means to assist the distance separation of such parachute system from the payload). This preferred arrangement prevents entanglement of drogue parachute 130 and preferably functions to push drogue parachute 130 beyond the wake (burble) at transonic velocities.

Preferably, drogue stiffener 224 functions to restrict the bridle from wrapping around a falling vehicle structure, payload structure, parachutist's body, etc. Applicant's preferred drogue parachute design is preferably configured to move in a relative manner with the vehicle structure/payload structure/parachutist as it spins or tumbles. This feature preferably prevents the drogue parachute from wrapping and tangling around the vehicle structure/payload structure/parachutist during high altitude freefall (at least embodying herein wherein said distance separating means comprises anti-tangling means for assisting prevention of tangling of said coupling means with the at least one payload). This is highly useful in that should a bridle line wrap around an adjacent structure, it could potentially disable the system preventing it from stabilizing the user and in an extreme situation even restrict the deployment of the main or reserve parachutes, which could result in a catastrophic and/or fatal malfunction.

Preferred drogue stiffeners 224 preferably comprise a carbon fiber slit cylinder having a length of about 10 feet, or alternately preferably, three carbon-fiber rods, having a diameter of about 0.125 inch, such rods located inside a Kevlar sleeve. In each embodiment, the stiffening member is long enough so that the drogue parachute will not touch pilot 204 when the parachute folds back. Three preferred examples of applicant's supported drogue are as follows:

A static embodiment where the stiffener is always deployed and is ejected upon release from the supporting structure. This requires an overhead structure to hold the stiff rod prior to deployment. Preferred rods are preferably tapered for a continuous moment resistance proportional to the length of the moment arm.

An ejecting style embodiment, which can be coiled to fit inside a parachute pack (see FIG. 11). The coiled rod preferably comprises a diameter sufficiently small to fit inside of parachute container 210 (i.e., 12-inch diameter or smaller is preferred for a container supporting a single human parachutist) can be placed inside the pack under tension; and, when parachute container 210 is opened, the coil will spring straight keeping the parachute bag and drogue parachute a safe distance from the falling parachutist, even if they are spinning or tumbling. A preferred material for this type of rod is carbon fiber. Alternately preferably, spring steel or a variety of composites is also sufficient.

A telescoping style ejection system (see FIG. 10) where the rod is a short set of nestled rods which telescope out when pulled, this could nestle down to a size where it could fit on or in parachute container 210.

It is noted that Applicant's drogue stiffeners 224 are generally useful in broader parachuting activities where the recovery profile includes periods of zero-gravity freefall. This occurs, for example, during high-altitude return-to-earth operations or any high atmospheric free-fall procedure.

Figure 12:
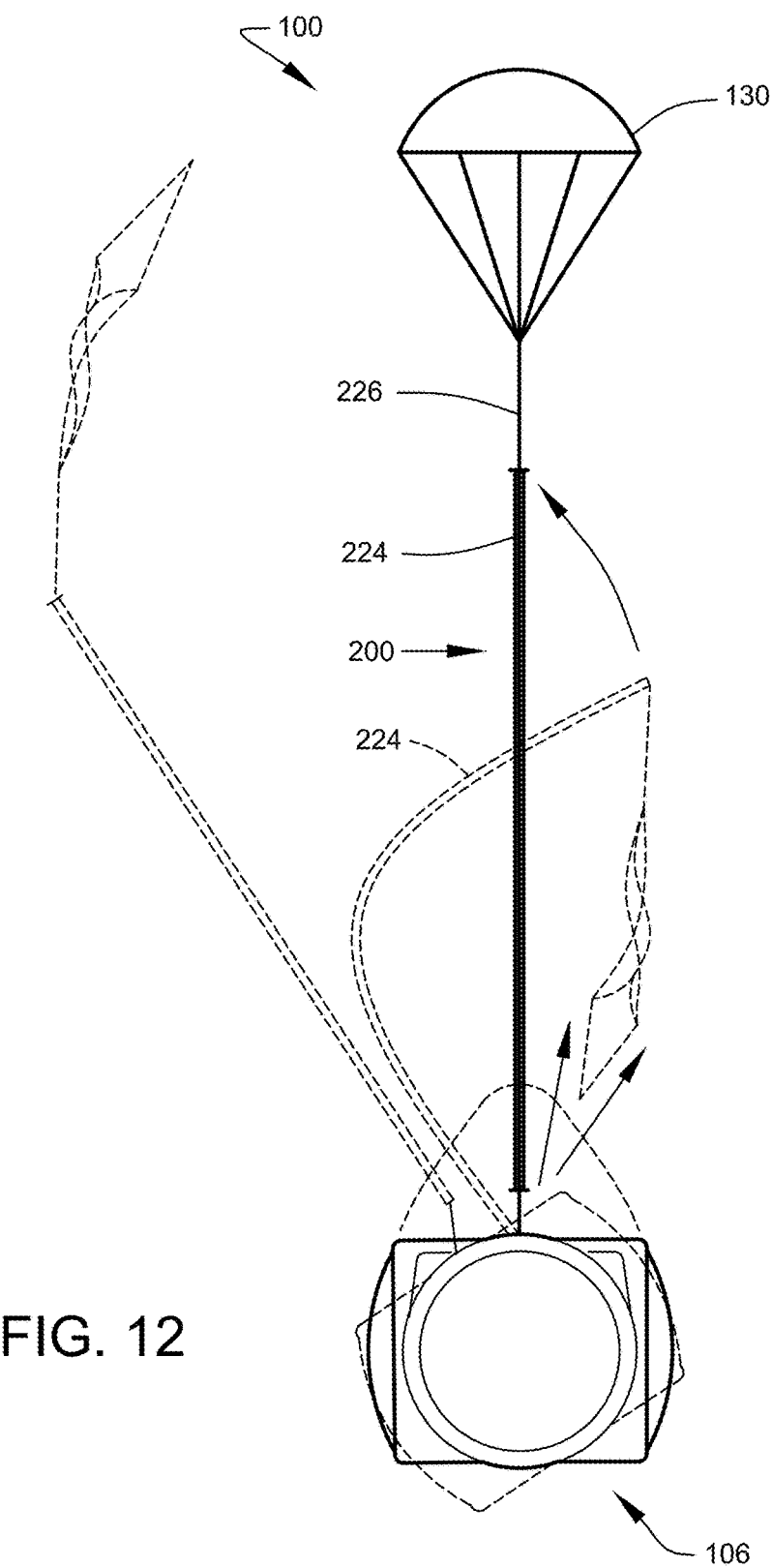
FIG. 12 shows a preferred drogue parachute of the stratospheric-visit system, according to a preferred embodiment of the present invention.

FIG. 12 shows a preferred drogue parachute 130 of a backup recovery system of the multi-passenger capsule 106 of FIG. 1. Referring to FIG. 12 and with continued reference to FIG. 1, in the unlikely event of a failure of the primary parawing 108, a drogue parachute 130 and secondary parafoils are preferably deployed to provide backup recovery. As in the single-pilot embodiment, drogue parachute 130 utilizes drogue stiffener 224 to restrict the bridle from wrapping around tumbling vehicle structures and preferably functions to assist drogue parachute 130 penetrate outward beyond the wake (burble) of the falling capsule 106 (at least embodying herein wherein said distance separating means comprises burble-confine penetrator means for assisting said parachute system to penetrate at least one burble confine during deployment of said parachute system).

FIG. 13A through FIG. 13E show a series of diagrams, illustrating a preferred launch procedure for stratospheric-visit vehicle 102 of FIG. 1, according to preferred apparatus and methods of the present invention. Initially, balloon 104 is preferably restrained by spool vehicle 236 of Balloon Launch Equipment 218, as shown, as shown. Balloon 104 is preferably coupled to parawing 108, which is preferably pre-deployed and is resting near the ground, as shown. Parawing 108 is preferably coupled to capsule 106, which is preferably resting in wheeled launch cradle 140, as shown. A second hold down 320 is preferably located between parawing 108 and capsule 106, as shown. The second hold down 320 may preferably comprise a fixed ballast member or may alternately preferably be designed to be movable relative to the ground during launch procedures.

Preferably, balloon 104 is filled with lighter-than-air gas enabling the lighter-than-air propulsion functions 115 of stratospheric-visit vehicle 102. When sufficient balloon buoyancy has been achieved, spool vehicle 236 gradually approaches parawing 108, as shown in FIG. 13B and releases balloon 104, which preferably lifts parawing 108 into flight position, as shown in FIG. 13C. Next, at least one or both of stratospheric-visit vehicle 102 and second hold down 320 move together as shown in FIG. 13C. Next, second hold down 320 is released, as shown in FIG. 13D, and stratospheric-visit vehicle 102 is preferably lifted away from wheeled launch cradle 140, as shown in FIG. 13E. Upon reading this specification, those with ordinary skill in the art will now appreciate that, under appropriate circumstances, considering such issues as design preference, user preferences, marketing preferences, cost, structural requirements, available materials, technological advances, etc., other launch arrangements such as, for example, the use of additional launch vehicles, the use of manual and/or automated launch gantries, etc., may suffice.

Thus, in accordance with preferred embodiments of the present invention, there is provided, relating to stratospheric-visit system 100, a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and deploying, prior to the step of launching, the parachute system. Also, it provides such a method wherein the parachute system comprises at least one parafoil system.

In addition, stratospheric-visit system 100 preferably provides such a method wherein the parachute system comprises at least one drogue system. In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and coupling the parachute system within the at least one payload; distance-separating the parachute system from the at least one payload; and controlling compressive resistance of the distance separation of the parachute system from the at least one payload; wherein controlling distance separation of such parachute system from the at least one payload is achieved. And, it provides such a stratospheric-visit method wherein the step of distance-separating comprises the step of assisting prevention of tangling of the parachute system with the at least one payload.

Further, stratospheric-visit system 100 preferably provides such a stratospheric-visit method wherein the step of distance-separating comprises the step of assisting the parachute system to penetrate at least one burble confine during deployment of the parachute system. In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and assisting traversing of at least the at least one human across the ground; supporting, during launch, at least the at least one human, wherein the step of supporting comprises the steps of minimizing injury, during launch, to at least the at least one human and at least one accompanying human life support environment, conforming support to at least the at least one human and the at least one accompanying human life support environment, cushioning at least the at least one human and the at least one accompanying human life support environment, and permitting movement in both rotational and translational directions.

Even further, stratospheric-visit system 100 preferably provides such a stratospheric-visit method further comprising the step of terminating the step of supporting, during launch of the at least one payload. In accordance with another preferred embodiment hereof, this invention provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and wherein the step of tethering comprises the steps of coupling the lighter-than-air propulsion system to at least one lift-resisting ground restraint with at least one balloon-to-restraint coupler; coupling the at least one payload to the at least one balloon-to-restraint coupler; wherein the step of un-tethering comprises the step of decoupling the at least one balloon-to-restraint coupler from the at least one lift-resisting ground restraint, wherein the at least one payload, after the step of decoupling the at least one balloon-to-restraint coupler from the at least one lift-resisting ground restraint, remains coupled to the lighter-than-air propulsion system, wherein the at least one payload launches with the lighter-than-air propulsion system.

In accordance with another preferred embodiment hereof, stratospheric-visit system 100 preferably provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and wherein the step of controlling at least one human life support environment comprises the steps of coupling at least one equipment controller to a torso of the at least one human, providing a rigid adapter to closely abut a front of the torso of the at least one human, adjusting dimensions of the rigid adapter to fit the front of the torso of the at least one human prior to launch, rigidly attaching a mount, to attach an oxygen supply, to the rigid adapter, and wherein the oxygen supply is positionable to be transported along the front torso of the at least one human.

In accordance with another preferred embodiment hereof, stratospheric-visit system 100 preferably provides a stratospheric-visit method, relating to a stratospheric visit using lighter-than-air travel, comprising the steps of: providing at least one payload comprising at least one human, and at least one parachute system; launching the at least one payload; wherein the step of launching comprises the steps of lighter-than-air-propelling the at least one payload with a lighter-than-air propulsion system, tethering, initially to ground, the lighter-than-air propulsion system, and un-tethering, from the ground, the lighter-than-air propulsion system; controlling, during the stratospheric visit, at least one human life support environment of the at least one human; controlling travel, in the stratospheric visit, of the at least one payload; communicating, during the stratospheric visit, with the at least one payload; and recovering the at least one human; wherein the step of recovering comprises the steps of performing separation of at least the at least one human from the lighter-than-air propulsion system, decelerating, with the at least one parachute system, at least the at least one human after the separation of at least the at least one human from the lighter-than-air propulsion system, and landing of at least the at least one human; and providing a stratospheric-visit vehicle to transport multiple humans on the stratospheric visit; wherein the step of providing the stratospheric-visit vehicle comprises the steps of providing seating to serve the multiple humans, providing the at least one human life support environment to serve the multiple humans during a multiple hour stratospheric visit, and providing visual access to serve the multiple humans with viewing of Earth.

Figure 14A:
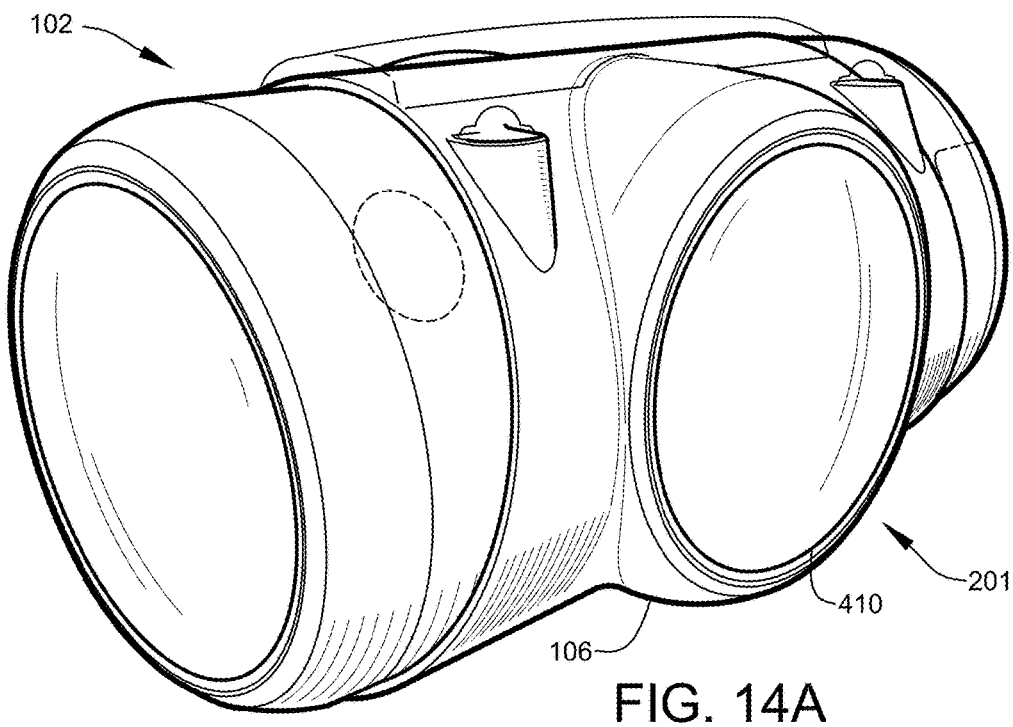
FIG. 14A and FIG. 14B show a preferred multi-passenger capsule according to a preferred embodiment of FIG. 3.
Figure 14B:
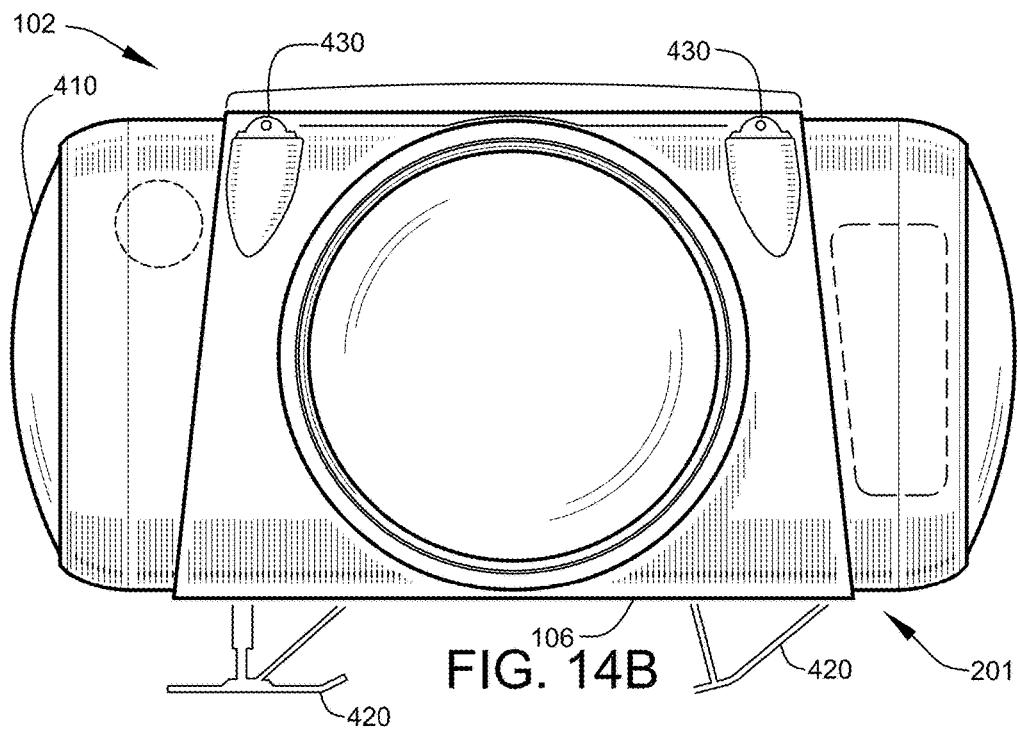

FIG. 14A and FIG. 14B show a preferred multi-passenger capsule according to a preferred embodiment of FIG. 3. When multiple persons utilize stratospheric-visit system 100, stratospheric-visit vehicle 102 preferably comprises capsule 106. Capsule 106 preferably permits at least one pilot to take additional passengers in a stratospheric visit. Capsule 106 preferably comprises a habitable environment for the multiple humans during a multiple-hour stratospheric visit. Capsule 106 preferably further comprises at least one view-port 410 to permit viewing the external environment while on stratospheric visit. Capsule 106 preferably further comprises at least one landing system, preferably comprising landing gear 420. Capsule 106 preferably further comprises avionics and recovery subsystems similar to single-pilot mission. Capsule 106 preferably further comprises rigging couple points 430, permitting coupling to said lighter-than-air propulsion system, preferably balloon 104, and parawing 108.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A stratospheric-visit system, relating to a stratospheric visit using lighter-than-air travel, comprising:
   a) a payload system structured and arranged to provide at least one payload;
   b) a launch system structured and arranged to launch the payload;
   c) wherein said launch system comprises a lighter-than-air propulsion system,
      a tethering system structured and arranged to tether, initially to ground, said lighter-than-air propulsion system, and
      an un-tethering system structured and arranged to un-tether, from the ground, said lighter-than-air propulsion system;
   e) a travel control system structured and arranged to control, in the stratospheric visit, travel of the payload;
   f) a communication system structured and arranged for communication during said stratospheric-visit; and
   g) a recovery system structured and arranged to recover the payload;
   h) wherein said recovery system comprises
      a separator system structured and arranged to perform separation of the payload from said lighter-than-air propulsion system,
      at least one drogue parachute structured and arranged to decelerate the payload after the separation of the payload from said lighter-than-air propulsion system, wherein the drogue parachute comprises:
      a bridle line for coupling the drogue parachute to the payload; and
      a drogue stiffener comprising an elongate carbon fiber rod coupled to the bridle line for stiffening an elongate portion of the bridle line to prevent entanglement of the bridle line with the payload and to separate the payload from the drogue parachute; and
      at least one parafoil to assist landing of the payload.

2. The stratospheric-visit system according to claim 1 further comprising:
   a) coupling device for coupling said drogue parachute within the at least one payload;
   b) wherein said coupling device comprises a distance separating device for distance-separating said drogue parachute from the at least one payload; and
   c) wherein said distance separating device comprises a compressive-resistance control system for controlling compressive resistance of said distance separating device to assist the distance separation of said drogue parachute from the at least one payload;
   d) wherein controlling distance separation of said drogue parachute from the at least one payload is achieved.

3. The stratospheric-visit system according to claim 1 wherein said elongate carbon fiber rod has a c-shaped cross section for coupling the drogue stiffener around the bridle line for assisting prevention of tangling of said coupling device with the at least one payload.

4. The stratospheric-visit system according to claim 2 wherein said distance separating device comprises burble-confine penetrator means for assisting said drogue parachute to penetrate at least one burble confine during deployment of said parachute system.

5. The stratospheric-visit system according to claim 1 wherein said drogue parachute is stowed in a coiled configuration and is deployable by self springing into a linear and stiffened configuration.

6. The stratospheric-visit system according to claim 1 further comprising:
   a) coupling means for coupling said drogue parachute within the at least one payload;
   b) wherein said coupling means comprises distance separating means for distance-separating said drogue parachute from the at least one payload;

c) wherein said distance separating means comprises compressive-resistance control means for controlling compressive resistance of said distance separating means to assist the distance separation of said drogue parachute from the at least one payload; and d) wherein controlling distance separation of said drogue parachute from the at least one payload is achieved.

7. The stratospheric-visit system according to claim 6 wherein said distance separating means comprises anti-tangling means for assisting prevention of tangling of said coupling means with the at least one payload.

8. The stratospheric-visit system according to claim 6 wherein said distance separating means comprises burble-confine penetrator means for assisting said parachute system to penetrate at least one burble confine during deployment of said parachute system.

9. A stratospheric-visit method, relating to a stratospheric visit using lighter-than-air travel, comprising the steps of:
a) providing at least one payload
b) launching the payload;
c) wherein the step of launching comprises the steps of propelling the payload with a lighter-than-air propulsion system,
  tethering, initially to ground, the lighter-than-air propulsion system, and
  un-tethering, from the ground, the lighter-than-air propulsion system;
e) controlling travel, in the stratospheric visit, of the payload, wherein the payload reaches altitudes of at least 70,000 ft;
f) communicating, during the stratospheric visit, with the payload; and
g) recovering the payload;
h) wherein the step of recovering comprises the steps of performing separation of the payload from the lighter-than-air propulsion system,
  using a deployed drogue parachute to decelerate the payload after the separation of the payload from the lighter-than-air propulsion system, wherein the drogue parachute comprises:
   a bridle line for coupling the drogue parachute to the payload; and
   a drogue stiffener coupled to the bridle line for stiffening an elongate portion of the bridle line to prevent entanglement of the bridle line with the payload during descent and to separate the payload from the drogue parachute; and
  further decelerating the payload with a parafoil wherein the parafoil is deployed at an altitude less than that at which the drogue parachute is deployed.

10. The stratospheric-visit method according to claim 9 wherein only the parafoil is used to decelerate the payload.

11. The stratospheric-visit method according to claim 9 wherein only the drogue parachute is used to decelerate the payload.

12. A stratospheric-visit method, relating to a stratospheric visit using lighter-than-air travel, comprising the steps of:
a) providing at least one payload comprising
  at least one drogue parachute system, comprising:
   a drogue parachute coupled to the payload; and
   an elongate drogue stiffener comprising a carbon fiber rod configured to prevent entanglement of the drogue parachute with the payload during the descent and to separate the payload from the drogue parachute; and
  at least one parafoil;
b) launching the payload;
c) wherein the step of launching comprises the steps of propelling the payload with a lighter-than-air propulsion system,
  tethering, initially to ground, the lighter-than-air propulsion system, and
  un-tethering, from the ground, the lighter-than-air propulsion system;
e) controlling travel, in the stratospheric visit, of the payload;
f) communicating, during the stratospheric visit, with the payload; and
g) recovering the payload;
h) wherein the step of recovering comprises the steps of performing separation of the payload from the lighter-than-air propulsion system,
  decelerating, with the parafoil, the payload after the separation of the payload from the lighter-than-air propulsion system, wherein the payload is decelerated by the parafoil deployed at altitude; and
  landing the payload using the parafoil.

13. The stratospheric-visit method according to claim 12 further comprising distance-separating the parafoil from the payload using a compressive resistance device, the step of distance-separating comprises the step of assisting prevention of tangling of the parachute system with the at least one payload.

14. The stratospheric-visit method according to claim 13 wherein the step of distance-separating comprises the step of assisting the parachute system to penetrate at least one burble confine during deployment of the parachute system.

15. The method of claim 9 wherein the drogue stiffener comprises a carbon-fiber slit cylinder having a length of about ten (10) feet.

16. The method of claim 9 wherein the drogue stiffener comprises three carbon-fiber rods.

17. The method of claim 9 wherein the parafoil comprises stiffening members.

18. The method of claim 17 wherein the stiffening members comprise rigidizing members to form a geometry-controlling framework.

19. The method of claim 17 wherein the stiffening members comprise ribs, spars, struts, braces, tension members, or inflated cells.

* * * * *